(12) United States Patent
Ghavamzadeh et al.

(10) Patent No.: US 10,586,200 B2
(45) Date of Patent: Mar. 10, 2020

(54) SYSTEMS AND METHODS ASSOCIATED WITH SEQUENTIAL MULTIPLE HYPOTHESIS TESTING

(71) Applicant: ADOBE INC., San Jose, CA (US)

(72) Inventors: Mohammad Ghavamzadeh, San Jose, CA (US); Alan John Malek, Los Gatos, CA (US); Yinlam Chow, San Mateo, CA (US); Sumeet Katariya, Madison, WI (US)

(73) Assignee: Adobe Inc., San Jose, CA (US)

(*) Notice: Subject to any disclaimer, the term of this patent is extended or adjusted under 35 U.S.C. 154(b) by 437 days.

(21) Appl. No.: 15/156,008

(22) Filed: May 16, 2016

(65) Prior Publication Data

US 2017/0330114 A1    Nov. 16, 2017

(51) Int. Cl.
*G06Q 10/06* (2012.01)
*G06Q 30/02* (2012.01)

(52) U.S. Cl.
CPC ....... *G06Q 10/067* (2013.01); *G06Q 30/0201* (2013.01)

(58) Field of Classification Search
CPC ........... G06F 9/00; G06Q 10/00; G06Q 99/00
See application file for complete search history.

(56) References Cited

U.S. PATENT DOCUMENTS

2006/0080360 A1* 4/2006 Young .................... H04H 60/06
2007/0239361 A1* 10/2007 Hathaway ............... G06F 17/18
702/19
2008/0133454 A1* 6/2008 Markl ............... G06F 16/24539
2014/0278198 A1* 9/2014 Lyon .................. G06Q 30/0201
702/121

FOREIGN PATENT DOCUMENTS

CA          2708908  A1 * 12/2010  .......... G06F 11/3672

OTHER PUBLICATIONS

Farcomeni, Alessio. 2008. A review of modern multiple hypothesis testing, with particular attention to the false discovery proportion. Statistical methods in medical research. 17. 347-88.*

(Continued)

*Primary Examiner* — Alan S Miller
*Assistant Examiner* — Jay-Ming Wang
(74) *Attorney, Agent, or Firm* — Shook, Hardy & Bacon, L.L.P.

(57) ABSTRACT

Embodiments of the present invention are directed at providing a sequential multiple hypothesis testing system. In one embodiment, feedback is collected for hypothesis tests of a multiple hypothesis tests. Based on the collected feedback, a sequential p-value is calculated for each of the hypothesis tests utilizing a sequential statistic procedure that is designed to compare an alternative case with a base case for a respective hypothesis test. A sequential rejection procedure can then be applied to determine whether any of the hypothesis tests have concluded based on the respective p-value. A result of the determination can then be output to apprise a user of a state of the multiple hypothesis test. This process can then be repeated until a maximum sample size is reached, termination criterion is met, or all tests are concluded. Other embodiments may be described and/or claimed.

20 Claims, 7 Drawing Sheets

(56) References Cited

OTHER PUBLICATIONS

Goeman, Jelle & Solari, Aldo. 2012. The sequential rejection principle of familywise error control. The Annals of Statistics.*

Grazier G'Sell, Max & Wager, Stefan & Chouldechova, Alexandra & Tibshirani, Robert. 2015. Sequential selection procedures and false discovery rate control. Journal of the Royal Statistical Society: Series B (Statistical Methodology).*

Shafer, Glenn & Shen, Alexander & Vereshchagin, Nikolay & Vovk, Vladimir. 2011. Test Martingales, Bayes Factors and p-Values. Statistical Science—Stat Sci.*

Farcomeni, Alessio. 2008. A review of modern multiple hypothesis testing, with particular attention to the false discovery proportion. U Statistical methods in medical research 17. 347-88. (Year: 2008).*

Goeman, Jelle & Solari, Aldo. 2012. The sequential rejection principle of familywise error control. The Annals of Statistics. (Year: 2012).*

Grazier G'Sell, Max & Wager, Stefan & Chouldechova, Alexandra & Tibshirani, Robert. 2015. Sequential selection procedures and w false discovery rate control. Journal of the Royal Statistical Society: Series B (Statistical Methodology). (Year: 2015).*

Shafer, Glenn & Shen, Alexander & Vereshchagin, Nikolay & Vovk, Vladimir. 2011. Test Martingales, Bayes Factors and p-Values. X Statistical Science—Stat Sci. (Year: 2011).*

Romano, Joseph & Wolf, Michael. (2005). Exact and Approximate Stepdown Methods for Multiple Hypothesis Testing. Journal of the American Statistical Association. 100. 94-108. 10.2139/ssrn.563267. (Year: 2005).*

Shafer, Glenn et al., "Test Martingales, Bayes Factors and p-Values", Institute of Mathematical Statistics in Statistical Science, 2011, vol. 26, No. 1, 84-101.

* cited by examiner

SYSTEMS AND METHODS ASSOCIATED WITH SEQUENTIAL MULTIPLE HYPOTHESIS TESTING

BACKGROUND

In determining whether there is a statistical distinction between a given option (e.g., an existing website design) and an alternative option (e.g., a new website design) A/B hypothesis testing can be utilized. For example, consider an online retailer that is trying to determine which of two layouts for a website provides for more completed transactions, or a higher dollar amount for each transaction. In A/B hypothesis testing the two layouts can be distributed equally to visitors of the online retailer's site. Then the visitors' interactions with each layout can be monitored for feedback such as, whether the visitor made a purchase or an amount of each visitors purchase. Based on this feedback one of the two designs that exhibits better performance can be selected via A/B hypothesis testing.

One manner of implementing A/B hypothesis testing is through a fixed-horizon configuration where a total amount of feedback needed to conclude the test is determined prior to implementing the A/B hypothesis test. Alternatively, an A/B hypothesis test could be implemented in a sequential configuration where a determination is made as to whether to conclude the test for each piece of feedback collected. In some instances, multiple alternative options may need to be tested against the given option. Such instances are referred to as multiple hypothesis tests. As an example, consider the online retailer discussed above, suppose the online retailer instead has numerous alternative website layouts that need to be tested. In such an example, a multiple hypothesis test could be utilized to determine which one of the numerous alternative website layouts achieves the most desired results for the online retailer. In fixed-horizon multiple hypothesis testing, a multiple hypothesis test is run until a total number of samples, referred to as the horizon, has been collected. The horizon can be determined, at least in part, to guarantee a desired level of statistical error. Once the horizon is reached p-values can be computed for the hypothesis tests of the fixed-horizon multiple hypothesis test. Various algorithms can then be utilized that take these p-values as input and determine which of the multiple hypothesis tests should be rejected (i.e., which of the respective null hypotheses should be rejected).

Fixed-horizon hypothesis testing has several drawbacks. A first drawback of fixed-horizon hypothesis testing is that it is desirable for the tester to be able to view results of the test as the feedback is collected and analyzed. As a result, in some instances, the tester may prematurely stop a fixed-horizon hypothesis test upon erroneously confirming or rejecting the null hypothesis based on observed feedback. By stopping the test early though, the tester has circumvented the statistical guarantees provided by the fixed-horizon hypothesis test with respect to the desired level of statistical error, mentioned above. This is because the desired statistical error is not guaranteed without reaching the number of samples defined by the fixed horizon. Another drawback is that the fixed-horizon is based at least in part on estimates made by the tester for baseline statistics and minimum desired effects, which may not be accurate and may be difficult for an inexperienced tester to accurately estimate.

SUMMARY

Embodiments of the present invention are directed at providing a sequential multiple hypothesis testing system. Such a multiple hypothesis testing system can be implemented, at least in part, by extending aspects of fixed horizon multiple hypothesis. In extending aspects of the fixed-horizon multiple hypothesis testing to sequential multiple hypothesis testing, there are several issues presented. A first issue is determining an appropriate p-value for the sequential setting, hereinafter referred to as a sequential p-value. Due to the sequential nature of the test, a sequential p-value would need to be able to be defined at each time step for each of the hypothesis tests. A second issue is ensuring a desired level of statistical error is achieved prior to either rejecting or affirming a hypothesis test. These issues are discussed extensively herein.

To accomplish this, in one embodiment, the multiple hypothesis testing system can collect feedback for hypothesis tests of a multiple hypothesis test. For example, the multiple hypothesis testing system can be configured to automatically distribute multiple website designs across visitors to an online business. The multiple website designs can include a base website design (e.g., an existing website design) and a number of alternative website designs. The multiple hypothesis testing system can then monitor the interaction of these visitors with the multiple website designs to collect feedback on each of the website designs (e.g., whether the visitor clicked on the website design, whether the visitor purchased something utilizing the website design, an amount of time the visitor spent viewing the website design, etc.)

Based on the collected feedback, a sequential p-value is calculated for each of the hypothesis tests utilizing a sequential statistic procedure that is designed to compare an alternative case (e.g., one of the alternative website designs) with a base case (e.g., the existing website design). In embodiments, the sequential p-value is defined to be in an inverse relationship with the sequential statistic procedure. A sequential rejection procedure can then be applied to determine whether any of the hypothesis tests have concluded based on the respective p-value. A result of the determination can then be output by the sequential hypothesis testing system to apprise a user of a state of the multiple hypothesis test. For example, the multiple hypothesis testing system could inform the user that a subset of the multiple hypothesis tests have concluded. In addition, the multiple hypothesis testing system could also inform the user of a result of each of the hypothesis tests that have concluded (e.g., whether one of the alternative website provides better results than the base website or whether the base website provides the better results). This process can then be repeated until a maximum sample size is reached, termination criterion is met, or all tests are concluded.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
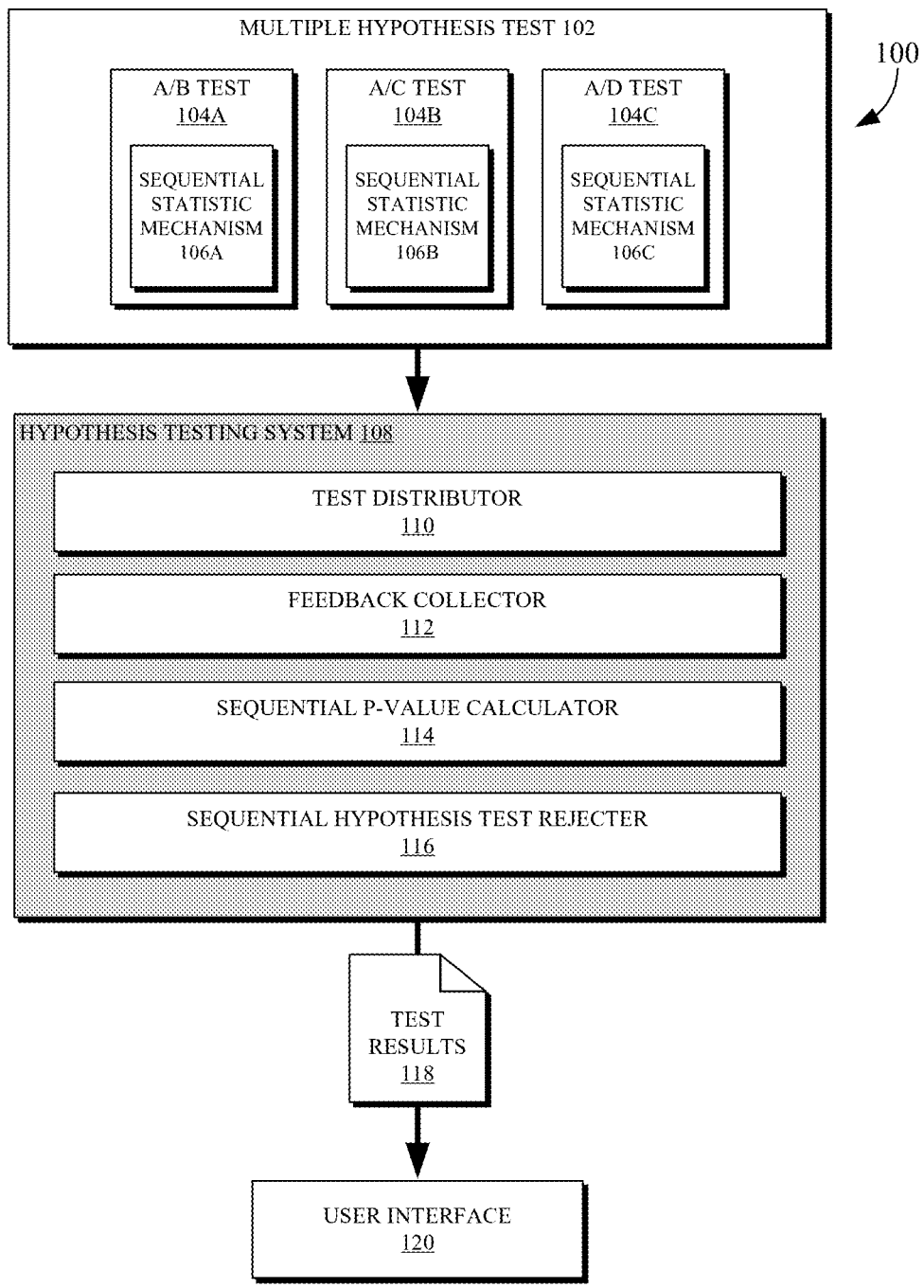
FIG. 1 depicts aspects of an illustrative testing environment configured to perform sequential multiple hypothesis testing, in accordance with various embodiments of the present disclosure.

A commonly presented issue in practical business analysis is trying to determine which of two options provide a better result with regard to a given population. An example of this issue is trying to determine which of two different web page designs, or other digital content design, provide better results, such as number of clicks generated, with regard to visitors of an associated website. To determine which of the two options provide better results with the given population, a process called A/B testing is often relied on. In A/B testing, there is generally a control option represented by 'A,' and an alternative option represented by 'B.' In A/B testing one of two hypotheses (e.g., null hypothesis or alternative hypothesis) is sought to be confirmed. These two hypotheses include a null hypothesis, commonly referred to as $H_0$, and an alternative hypothesis, commonly referred to as $H_1$. The null hypothesis proposes that the effects of A and B are equal; that is there is no significant difference between A and B. The alternative hypothesis, on the other hand, proposes that the effects of A and B are not equal; that is there is a significant difference between option A and option B. As used in this context, a significant difference is one that is not attributable to sampling or experimental error.

In order to confirm either the null hypothesis or the alternative hypothesis, options A and B are equally apportioned to members of the given population and feedback, or samples, are collected concerning an observable effect of the two options. This feedback can then be utilized to determine whether the effect of A is equal to B (i.e., affirm the null hypothesis) or whether the effect of A is not equal to B (i.e., reject the null hypothesis). As an example, consider a website having a current design (i.e., the control option) and a new design (i.e., the alternative option). To affirm whether an effect of the current design is equal to, or different from, an effect of the new design, the current design and the new design can be automatically apportioned among users visiting the website and feedback can be collected by monitoring the interaction between the users and the two designs. This feedback could be any type of feedback that the test designer views as important in determining a difference between the current design and the alternative design (e.g., number of clicks). By analyzing this feedback, it can be confirmed whether option A elicited more clicks, or fewer clicks, than option B, or whether option A elicited the same number of clicks as option B.

One aspect of A/B testing is identifying when a test can be declared to have completed such that the results of the test are statistically sound. Determining when a test can be declared to have completed is important in several aspects. A first aspects is because the provisioning of the base option and the alternative option and the collection and processing of the feedback, which is computationally intensive, can be terminated. An additional aspect is that a winner (e.g., the better performing option, if there is one) can be declared, thereby enabling the better performing option to be implemented. In determining whether the completion of a test can be considered statistically sound, two types of errors are commonly considered. The first type of error is referred to as a type I error and is commonly represented by '$\alpha$.' A type I error occurs in instances where a difference between the effects of A and the effects of B is declared when there is actually no difference between the two options (e.g., option A is erroneously declared to perform better than option B). A common measurement for type I error is referred to as confidence level, which is represented by the equation: 1−type I error (i.e., 1−$\alpha$). The second type of error is considered a Type-II error and is commonly represented by '$\beta$.' A Type-II error occurs in instances where the effect of option A and the effect of option B are different, but the two options are erroneously declared to be equal (e.g., option A is erroneously declared to be equal to option B). A common measurement for type II error is referred to as power, or statistical power, which is represented by the equation: 1−type II error (i.e., 1−$\beta$). A goal in A/B testing is to identify when a test can be declared to have completed such that the type I error, or confidence level, and the type II error, or power, are within a determined range of acceptability (e.g., confidence level of 0.95, or 95%, and power of 0.8, or 80%). To expand on this, at a confidence level of 95%, results of the test can be declared to be 95% assured that a winner among the options is not erroneously declared (e.g., option A is declared to be a winner when there is actually no significant difference between option A and option B). In contrast, at a power of 80%, results of the test can be declared to be 80% assured that no significant difference between the options is erroneously declared (e.g., option A and option B are declared to have no significant difference, when there is actually a winner).

A common way of performing A/B testing, in a manner that maintains control of type I and type II errors, is referred to as fixed-horizon hypothesis testing. Fixed-horizon hypothesis testing utilizes a sample size calculator that takes as input: a desired confidence level; a desired power; a baseline statistic for the base option (e.g., click through rate); and a minimum detectable effect (MDE). Based on these inputs, the sample size calculator outputs a horizon, 'N.' The horizon, 'N,' represents the amount of feedback, or number of samples, to be collected for each of the base option and alternative option in order to achieve the desired confidence level and desired power. Returning to the previous example, if the base option is a current design for a website, the alternative option is a new design for the website, and the sample size calculator calculates that the horizon N=1000, then the current design would be presented 1000 times, the new design would be presented 1000 times, and corresponding feedback would be collected. This feedback can be analyzed to determine whether to reject the null hypothesis, $H_0$, or accept it.

Fixed-horizon hypothesis testing has several drawbacks. A first drawback of fixed-horizon hypothesis testing is that it is desirable for the tester (e.g., the person implementing the test) to be able to view results of the test as the feedback is collected and analyzed. As a result, in some instances, the tester may prematurely stop a fixed-horizon hypothesis test upon erroneously confirming or rejecting the null hypothesis based on observed feedback. By stopping the test early though, the tester has circumvented the guarantees provided by the fixed-horizon hypothesis test with respect to the desired confidence level and desired power. This drawback is commonly referred to as the peeking problem. Another drawback is that the fixed horizon, N, is based at least in part on estimates for the baseline statistic and MDE, which may not be accurate and may be difficult for an inexperienced tester to accurately estimate.

Another form of A/B testing is referred to as sequential hypothesis testing. Like fixed-horizon hypothesis testing, sequential hypothesis testing samples feedback for each of the options (i.e., the base option, A, and the alternative option, B). Unlike fixed-horizon hypothesis testing, sequential hypothesis testing does not utilize a fixed amount of feedback to determine when the test can be stopped. As such, sequential hypothesis testing does not require a user to estimate the baseline statistic or the minimum detectable effect. Sequential hypothesis testing takes as input a desired confidence level (i.e., 1−Type I error=1−$\alpha$) and a desired power (1−Type II error=1−$\beta$). Sequential hypothesis testing outputs a statistic, $A_n$, and a decision boundary, $\gamma_n$ at each time 'n,' where 'n' reflects the number of samples, or amount of feedback, collected. In sequential hypothesis testing the null hypothesis, $H_0$, is rejected as soon as $A_n \geq \gamma_n$. As such, in sequential hypothesis testing, feedback is analyzed as the feedback is collected to determine whether the test can be stopped. For example, consider where a base option is an existing website design and an alternative option is a new website design. In such an example, after every instance of feedback is collected (e.g., after every click or conversion caused by one of the two website designs) a determination can be made as to whether the test can be concluded.

The hypothesis testing discussed above is limited to a single alternative option, B, being compared against a base option, A. In many situations, however, it is desirable to consider multiple alternative options (e.g., B, C, D) respectively against the base option, A. This is where multiple hypothesis testing comes into view. A problem presented with multiple hypothesis testing is controlling the Type I error across all of the multiple hypothesis tests. That is to say, a problem is controlling the number of hypothesis tests in which a winner is erroneously declared (e.g., one website design is declared to perform better than another website design, when there is no significant difference between the two website designs). Two common mechanisms for controlling the Type I error across the multiple hypothesis test are the family-wise error rate (FWER) and the false discovery rate (FDR).

To introduce these concepts of FWER and FDR, reference will be made to Table 1.

TABLE 1

Various Scenarios in Multiple Hypothesis Testing

|  | accepted | rejected | total |
|---|---|---|---|
| $H_0$ true | U | V | $m_0$ |
| $H_0$ false | T | S | $m - m_0$ |
| total | m − R | R | m |

In table 1: m is the total number of tested hypotheses; $m_0$ is the number of true null hypotheses, m−$m_0$ is the number of true alternative hypotheses; V is the number of false positives (i.e., Type I error), also referred to as false discoveries; S is the number of true positives, also referred to as true discoveries; T is the number of false negatives (i.e., Type II error); U is the number of true negatives; and R is the total number of rejected null hypotheses. It should be noted that R is an observable random variable, while S, T, U, and V are all unobservable random variables. The FWER is defined as the probability of making at least one false rejection and can be expressed in accordance with the following equation:

$$FWER = \mathbb{P}(V \geq 1) \qquad \text{Eq. 1}$$

where $\mathbb{P}$ represents the statistical probability function. From this equation, it will be appreciated that FWER is a conservative notion of Type I error in multiple hypothesis testing. FDR, on the other hand, represents a more relaxed notion of Type I error and is defined as the expected proportion of false rejections among all rejections. As such, FDR can be expressed in accordance with the following equation:

$$FDR = \mathbb{E}\left[\frac{V}{\max(R, 1)}\right] \qquad \text{Eq. 2}$$

where $\mathbb{E}$ represents statistical expectation.

Fixed-horizon multiple hypothesis testing has been relatively well-studied. In fixed-horizon multiple hypothesis testing, one of the first issues is determining how the horizon should be calculated. Remember that the manner of determining the horizon, N, described above, is for single hypothesis testing, and thus, would need to be extended to multiple hypothesis tests. Various methods have been developed for extending the fixed-horizon hypothesis testing to multiple hypothesis testing to maintain control over the Type I error. One of these methods is the Bonferroni method that utilizes the FWER approach to controlling Type I errors. In accordance with the Bonferroni method, if the desirable FWER is equal to the Type I error, $\alpha$, and there are m hypothesis tests, then the horizon is calculated utilizing $\alpha/m$ as the Type I error input for the sample size calculator discussed above. The sample size calculator would then utilize this Type I error value, along with the other input values mentioned above, to determine the horizon, N, for each of the base option and alternative options. As such, the total number of samples needed would be represented by N*(m+1), because there are m alternative options and one base option, for all tests.

In fixed-horizon multiple hypothesis testing, the test is run until the total number of samples has been collected. Once the total number of samples has been collected, a p-value can be computed for each of the hypothesis tests. Such a p-value can represent the probability of observing a more extreme test statistic in the direction of the alternative hypothesis for the respective hypothesis test. As such, if the p-value is relatively small, then the null hypothesis is rejected in favor of the alternative hypothesis. If the p-value is relatively large, then the null hypothesis is not rejected.

Once the p-values are computed for the fixed-horizon multiple hypothesis tests, then various algorithms that take the p-values as input and determine which of the multiple hypothesis tests should be rejected (i.e., which of the respective null hypothesis should be rejected) can be utilized. These algorithms include Bonferroni, Holm, and Hochberg algorithms for FWER, and Benjamin-Hochberg for FDR.

In implementing sequential multiple hypothesis testing, there are several issues presented. A first issue is determining an appropriate p-value for the sequential setting, hereinafter referred to as a sequential p-value. Due to the sequential nature of the test, a sequential p-value would need to be able to be defined at each time step for each of the hypothesis tests. A second issue is ensuring Type I and Type II error control utilizing FWER and/or FDR. A final issue is how to correct for correlation between the hypothesis tests. Correlation between the hypothesis tests is an important issue in the fixed-horizon multiple hypothesis setting, but the effect of correlation is more severe in sequential multiple hypothesis testing. This is because in the fixed-horizon multiple hypothesis setting, all tests are concluded at the same time (i.e., the horizon), while in sequential multiple hypothesis testing, tests may conclude at different times, or stages, of the multiple hypothesis test, which results in the statistics for the non-concluded tests needing correction. The hypothesis testing system disclosed herein resolves these issues. In addition, because tests can be concluded at different times, or stages, rather than awaiting a fixed horizon, the sequential multiple hypothesis testing described herein can conserve computing resources (e.g., clock cycles, memory, etc.) by reducing the number samples that need to be collected and integrated into the calculations.

Figure 6:
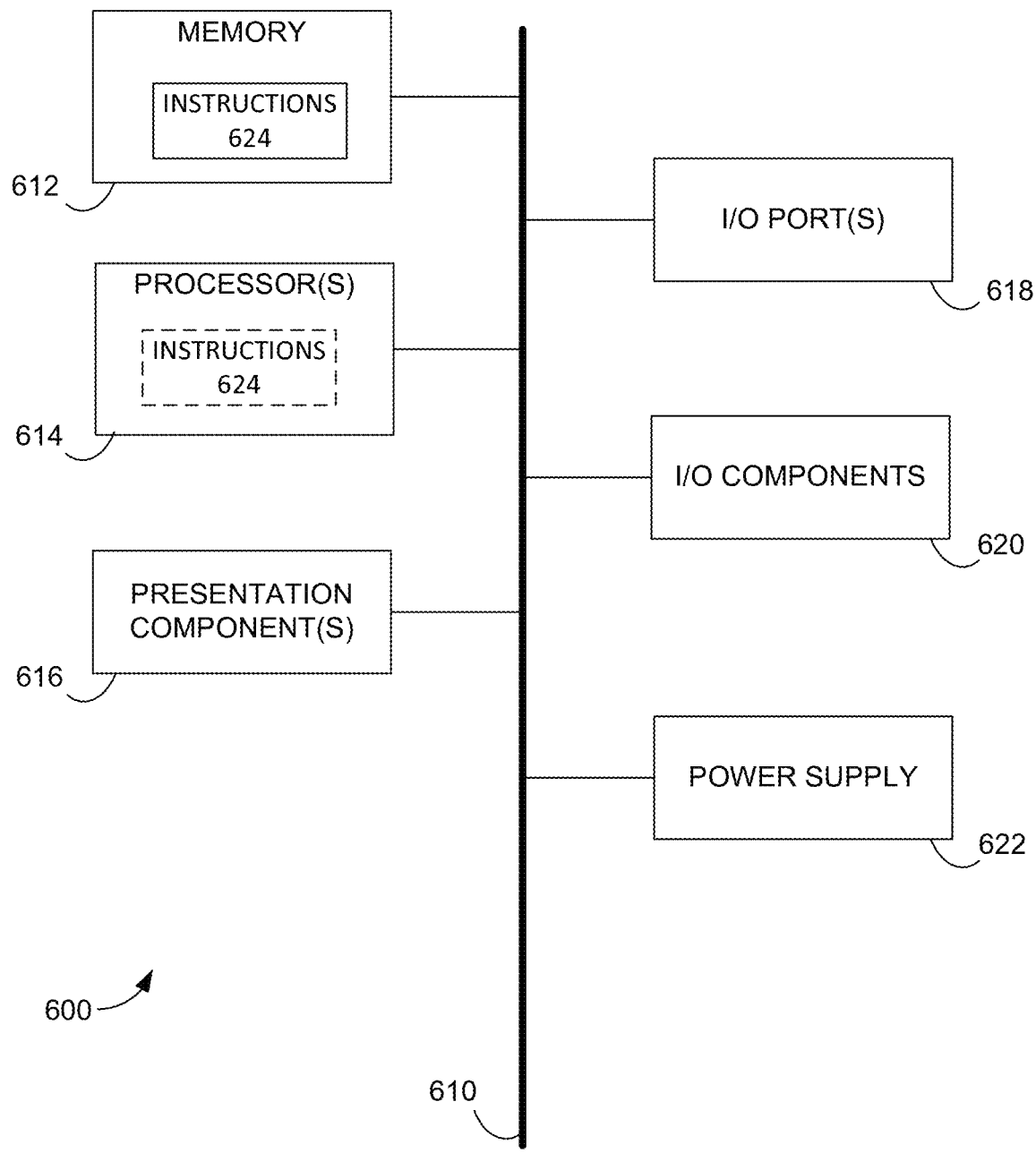
FIG. 6 is a block diagram of an example computing device in which embodiments of the present disclosure may be employed.

Turning to FIG. 1, FIG. 1 depicts aspects of an illustrative testing environment 100 configured to perform sequential multiple hypothesis testing, in accordance with various embodiments of the present disclosure. Testing environment 100 can be implemented via a computing device, an example of which is depicted by computing device 600 of FIG. 6. Testing environment 100 can be any type of testing environment that can be configured via hypothesis testing system 108 to perform multiple sequential hypothesis testing as described herein. Testing environment 100 can include, for example, ADOBE® Target (available from Adobe Systems Inc. of San Jose, Calif.), or any other suitable testing environment.

As depicted, testing environment 100 includes a multiple hypothesis test 102. Multiple hypothesis test 102 includes three hypothesis tests, an A/B test 104A, an A/C test 104B, and an A/D test 104C. As such, multiple hypothesis test 102 includes a base option A and three alternative options B, C, and D that are being compared against base option A. As an example, the base option and alternative options could represent variations of digital content designs. As used herein, digital content can refer to any content utilized to convey information to a user in an online or digital setting. Digital content designs can include website designs, designs of online marketing material (e.g., advertisements), designs of graphical user interfaces for online applications (e.g., smartphone applications or web applications, etc.), or components of any of these. It will be appreciated that this listing of digital content is not exhaustive and is merely meant to be illustrative in nature. As such, this listing of digital content should not be treated as limiting of this disclosure.

The hypothesis tests 104A-104C can be defined, for example, by a user (e.g., test administrator) of testing environment 100. It will be appreciated that the three alternative options depicted in FIG. 1 are merely selected to depict an example multiple hypothesis test and that multiple hypothesis test 102 could include any number of alternative options greater than or equal to two without departing from the scope of this disclosure. The base option, A, and alternative options, B/C/D, can represent any options capable of being compared against one another in at least one aspect. As an example, the base option could be a current online marketing design and the alternative options could each represent a respective alternative online marketing design. In such an example, the aspect being compared could be the number of clicks each design receives, the number of conversions (e.g., purchases of products and/or services, completion of surveys, etc.) each design receives, etc. In defining the multiple hypothesis test 102, a user could provide base option 'A' and alternative options, 'B,' 'C,' and 'D,' as input to testing environment 100. The base option and alternative options could be selected and submitted to testing environment 100 via, for example, user interface 120, or any other suitable input mechanism.

In embodiments, each of the multiple hypothesis tests 104A-104C can include a sequential statistic mechanism 106A-106C that hypothesis testing 102 can be configured to utilize for calculating a respective sequential statistic for each of hypothesis tests 104A-104C. A sequential statistic mechanism can be represented as 'A,' and can be defined by the user (e.g., test administrator) of testing environment 100. As such, testing environment 100 can be configured to take the sequential statistics mechanisms 106A-106C as input in conjunction with the base option and alternative options provided by the user. The sequential statistic mechanism can take the form of, for example, an equation. In embodiments, the sequential statistic mechanism is designed to enable hypothesis testing system 108 to generate a value that is representative of the one or more aspects being compared between the base option and the respective alternative option. Returning to the example above, in which the base option is a current online marketing design and the alternative options are alternative online marketing designs, a sequential statistic mechanism in such an example could be designed to compare the number of clicks generated by the base option and the number of clicks generated by the respective alternative option. The hypothesis testing system 108 could be configured to utilize the sequential statistic mechanism to determine a sequential statistic value, which is indicative of the comparison between the base option and the respective alternative option.

One way of controlling false discovery rate guarantees in a sequential hypothesis test is to design a sequential statistic mechanism that exhibits Martingale properties. Such properties specify the initial value of the sequential statistic to be unity, and ensure the sequential statistics form a stochastic process whose conditional expected values with respect to any upcoming observations, given all the past observations, are equal to the value of the current statistic.

To illustrate the Martingale properties in the sequential statistic mechanism, consider a hypothesis test with two hypotheses, a null hypothesis and an alternative hypothesis represented by $H_0$: $\theta=0$ and $H_1$: $\theta \neq 0$, where $\theta$ is the gap random variable. Suppose the data stream of gap realizations $\mathcal{D} = \{\theta_1, \ldots, \theta_n\}$ and the empirical gap $$\hat{\theta}_n = \sum_{i=1}^{n} \frac{\theta_i}{n}$$

are given. By defining the likelihood ratio as $$\Lambda_n = \frac{L_n(H_1)}{L_n(H_0)} = \frac{Pr(\mathcal{D} \mid H_1)}{Pr(\mathcal{D} \mid H_0)} = \frac{Pr(\hat{\theta}_n \mid H_1)}{Pr(\hat{\theta}_n \mid H_0)}.$$

One can show the sequential statistic $A_n$ satisfies the above Martingale properties under the null hypothesis. However, notice that $H_0$ in the above test is a simple hypothesis, while $H_1$ is a composite hypothesis. In such a case, the enumeration of $A_n$ is problematic due to the fact that the term $Pr(\hat{\theta}_n|H_1)$ is ill-posed. A common way to address this issue is to introduce the average likelihood ratio, i.e., $$\Lambda_n = \frac{Pr(\mathcal{D}|H_1)}{Pr(\mathcal{D}|H_0)} = \frac{\int Pr(\theta, V|H_1)Pr(\mathcal{D}|\theta, V, H_1)d\theta dV}{Pr(\mathcal{D}|H_0)}.$$

Utilizing analogous arguments from analyzing the likelihood ratio, this term satisfies the above Martingale properties (under the null hypothesis) as well. In particular, when $\theta$ is a random variable with Gaussian distributions of known variance, $V$. By imposing a Gaussian prior with mean zero and variance, $\tau$, over the mean gap of the alternative hypothesis, one can show that the sequential statistic becomes $$\Lambda_n(\tau) = \frac{Pr(\mathcal{D}|H_1)}{Pr(\mathcal{D}|H_0)} = \frac{\int Pr(\theta, V|H_1)Pr(\mathcal{D}|\theta, V, H_1)d\theta dV}{Pr(\mathcal{D}|H_0)} = \frac{\int \mathcal{N}(0,\tau)\mathcal{N}(\theta, V)d\theta}{\mathcal{N}(0, V)}.$$

However, in many applications the a-priori knowledge of variance V is unknown. In these cases we approximate the sequential statistic $A_n$ by replacing V with $V_n$, the variance of the empirical gap value $\hat{\theta}_n$, i.e., $$\Lambda_n(\tau) = \frac{\int Pr(\theta|H_1)Pr(\mathcal{D}|\theta, V_n, H_1)d\theta}{Pr(\mathcal{D}|H_0)} = \frac{\int \mathcal{N}(0,\tau)\mathcal{N}(\theta, V_n)d\theta}{\mathcal{N}(0, V_n)}.$$

This statistics can be written as $$\Lambda_n(\tau) = \sqrt{\frac{V_n}{V_n + \tau}} \exp\left(\frac{\tau \hat{\theta}_n^2}{2V_n(V_n + \tau)}\right).$$

Hypothesis testing system 108 includes a test distributor 110, feedback collector 112, a sequential p-value calculator 114, and a sequential hypothesis test rejecter 116. Each of these components can be coupled with one another and can be comprised of software, hardware, or any combination thereof. As depicted, hypothesis testing system 108 can be configured to take multiple hypothesis test 102 as input and can output test results 118, generated by the processing described in reference to the components of hypothesis testing system 108, to user interface 120 of the testing environment. These test results can include anything that can apprise a user of testing environment 100 of a state of multiple hypothesis test 102 within testing environment 100. For example, these test results could include an indicator of tests that have concluded, an indicator of tests that have yet to conclude, etc. As used herein, for a hypothesis test to have concluded, terminated, or been rejected, means that hypothesis testing system has rejected the null hypothesis for the hypothesis test.

Test distributor 110 can automatically (i.e., without user interaction) distribute the base option, A, and alternative options, B/C/D, to an intended audience. To accomplish this, test distributor 110 can be configured, for example, to receive requests for base option A. Such requests could be, for example, a website request, an online marketing request (e.g., request for advertising placement), or any other request for digital content. In response to the request, test distributor can select one of the base option or alternative options to distribute to satisfy the request. In a particular embodiment, test distributor 110 can be configured to accomplish the distribution of the alternative options in an equal, or substantially equal manner. In some embodiments, the base option can be distributed for each alternative option that is distributed. For instance, in the depicted example, option A could be distributed once for each distribution of option B, once for each distribution of option C, and once for each distribution of option D. In other embodiments, the base option could be distributed once for the set of alternative options. For example, option A could be distributed once for each distribution of B, C, and D, combined. As such, the distribution of A in these embodiments would substantially mirror that of each of the alternative options. The distribution of option A relative to the alternative options could be based on input from the user of testing environment 100 (e.g., test administrator), via user interface 120.

Feedback collector 112 can be configured to monitor the digital content distributed by test distributor 110 and collect feedback, or samples, associated with the base option, A, and the alternative options, B/C/D, of multiple hypothesis test 102. In embodiments, this feedback can be automatically collected by feedback collector 112. For example, returning again to the example above in which the base option is a current online marketing design and the alternative options are alternative online marketing designs, feedback collector 112 could be configured to automatically collect feedback by monitoring the number of clicks that were generated by each of the base option and alternative options.

It will be appreciated that, while a click, in some cases, may occur temporally close to the delivery of the distributed digital content, other feedback, such as conversions (e.g., a purchase of a good or service promoted by the digital content) may occur at a later time. In such instances, feedback collector 112 may be configured to wait for a period of time before determining that the delivery of the digital content did not elicit the desired interaction from the visitor. For example, suppose the digital content is promotional material for a smartphone, feedback collector 112 can be configured to wait a suitable period of time after delivery of the content before declaring that the digital content failed to cause the visitor to purchase the smartphone. This period of time for which feedback collector 112 can be configured to wait could be based on the event being monitored. For example, if monitoring for conversions for a book, the period of time could be shorter than if monitoring for conversions associated with an automobile. The period of time could be determined, for example, via input from a user of testing environment 100 (e.g., a test administrator).

This automatic tracking of feedback could be accomplished by feedback collector 112 in any number of ways. For example, the feedback can be collected via, for example, web beacons, pixel tracking, application monitoring, etc. It will be appreciated that these mechanisms for tracking the interaction of a user with a website, application, or other digital content are merely meant to be illustrative in nature and that any suitable mechanism for tracking such interactions can be used without departing from the scope of this disclosure.

Sequential p-value calculator 114 can take as input the feedback that is collected by feedback collector 112 and can be configured to utilize the feedback to generate a sequential p-value that is capable of being defined at each time step, 'n,' for each of hypothesis tests 104A-104C. In embodiments, the sequential p-value can be defined such that, at each time 'n,' the following relationship holds:

$$\mathbb{P}_{(H_{j,0} \text{ is rejected by time } n | H_{j,0} \text{ is true})} \leq p_j(n) \qquad \text{Eq. 3}$$

where $\mathbb{P}$ represents the statistical probability function, $j \in J=\{1, \ldots, m\}$, m being the total number of tested hypotheses (i.e., 3 in the depicted example); $j_{,0}$ is the null hypothesis for test j; and $p_j(n)$ is the sequential p-value for test j at time 'n,' and "$\mathbb{P}(.|.)$" represents conditional probability. Such a sequential p-value could be based, for example, on the sequential statistic values that are respectively produced for each of hypothesis tests 104A-104C via sequential statistic mechanism 106A-106C. In embodiments, the sequential p-value could be configured in an inverse relationship with the respective sequential statistic value. In embodiments, such a p-value can be defined in accordance with the following equation:

$$p_j(n) = \frac{1}{max_{i \leq n} \Lambda_j(n)}$$

Eq. 4 where $\Lambda_j(n)$ represents the sequential statistic of test j at time n, and the sequential statistic having martingale properties under the null hypothesis with a mean value 1. It will be appreciated that such a sequential p-value is non-increasing.

Sequential hypothesis test rejecter 116 can be configured to take the p-value for each of the hypothesis tests 104A-104C as input. Sequential hypothesis test rejecter 116 can then utilize the p-value for each of the hypothesis tests 104A-104C to determine the hypothesis tests to reject while controlling FDR and/or FWER via a sequential rejection procedure. In embodiments, this can be accomplished utilizing versions of the Bonferroni, Holm, Hochberg, or Benjamin-Hochberg rejection procedures that have been adapted for use in the sequential setting. Hereinafter, the adapted versions of these algorithms will be referred to as sequential Bonferroni, sequential Holm, sequential Hochberg, and sequential Benjamin-Hochberg, respectively. Each of these algorithms will be discussed in turn. Because tests can conclude at different times, or stages, rather than awaiting a fixed horizon, the sequential multiple hypothesis testing described herein can conserve computing resources (e.g., clock cycles, memory, etc.) by reducing the number of samples, or feedback, that need to be collected and integrated into the calculations. In addition, because the multiple hypothesis test is able to terminate more efficiently, the results of the multiple hypothesis test (e.g., a better digital content design) can be implemented at an earlier time, rather than waiting for a fixed horizon to be reached before being implemented.

To describe these sequential rejection procedures, the p-values of the m tests at time step n are denoted as $p_1(n), \ldots, p_m(n)$. In contrast, the p-values, sorted in ascending order, of the m tests at time step n are denoted as $p_{(1)}(n), \ldots, p_{(m)}(n)$. It will be appreciated that, because the p-values are non-increasing, when a test is rejected at time n, the test would also be rejected for all future time steps (e.g., n+1, . . . ).

Beginning with the sequential Bonferroni rejection procedure, the sequential Bonferroni rejection procedure rejects, at time n, all tests $j \in J=\{1, \ldots, m\}$ that satisfy:

$$p_j(n) \leq \frac{\alpha}{m}. \qquad \text{Eq. 5}$$

The sequential Holm rejection procedure starts by ordering the p-values of the m tests in ascending order. Beginning with the smallest p-value, which, in accordance with Equation 4, would correspond with the largest sequential statistic value, the Holm rejection procedure iterates through the ordered p-values until reaching a p-value that satisfies:

$$p_{(j)}(n) \geq \frac{\alpha}{m-j+1}. \qquad \text{Eq. 6}$$

Once such a p-value is reached that satisfies Equation 6, all tests having a smaller p-value are rejected. To put it another way, the sequential Holm rejection procedure, rejects, at time step n, tests $\{1, \ldots, j^*-1\}$, where j* is the smallest index such that Equation 6 holds.

The sequential Hochberg rejection procedure starts by ordering the p-values of the m tests in ascending order. Beginning with the largest p-value, which would correspond with the smallest sequential statistic value in accordance with Equation 4, the sequential Hochberg rejection procedure iterates through the ordered p-values until reaching a p-value that satisfies:

$$p_{(j)}(n) \leq \frac{\alpha}{m-j+1}. \qquad \text{Eq. 7}$$

Once such a p-value is reached, all tests having a smaller p-value are rejected. To put it another way, the sequential Hochberg rejection procedure, rejects, at time step n, tests $\{1, \ldots, j^*\}$, where j* is the largest index such that Equation 7 holds.

These first three sequential rejection procedures, sequential Bonferroni, Holm, or Hochberg, when utilized in conjunction with the p-value defined by Equation 4 can control the rejection of the individual hypothesis tests of the multiple hypothesis test to ensure a desired family-wise error rate (FWER) is achieved. The sequential Bonferroni procedure is the most conservative of this group.

The sequential Benjamin-Hochberg (BH) rejection procedure can be utilized in conjunction with the p-value defined by Equation 4 to control the rejection of the individual hypothesis tests of the multiple hypothesis test to ensure a desired false discovery rate (FDR) is achieved, as opposed to a FWER. The sequential BH rejection procedure starts by ordering the p-values of the m tests in ascending order. Beginning with the largest p-value, which, in accordance with Equation 4, would correspond with the smallest sequential statistic value, the sequential BH rejection procedure iterates through the ordered p-values until reaching a p-value that satisfies:

$$p_{(j)}(n) \le \frac{j\alpha}{m}. \quad \text{Eq. 8}$$

Once such a p-value is reached, all tests having a smaller p-value are rejected. To put it another way, the sequential BH rejection procedure, rejects, at time step n, tests $\{1, \ldots, j^*\}$, where $j^*$ is the largest index such that Equation 8 holds.

When there exists correlation between the tests, the Benjamin-Hochberg rejection procedure could include a correction factor represented as m'. Such a correction can be substituted for m in Equation 8 and can be represented by the following equation:

$$m' = m \sum_{j=1}^{m} \frac{1}{j}. \quad \text{Eq. 9}$$

This correction may be utilized in instances where the p-values of the hypothesis tests become dependent during the test, either because of the dependency between the hypothesis tests themselves or because of the manner in which the p-values are updated. In such instances, this correction can help ensure the desired FDR is achieved, however convergence of the test is slowed due to the correction. In other instances where the p-values of the hypothesis tests remain independent, or the desired FDR can be sacrificed, the correction can be excluded for faster convergence (e.g., sample efficiency).

Figure 2B:
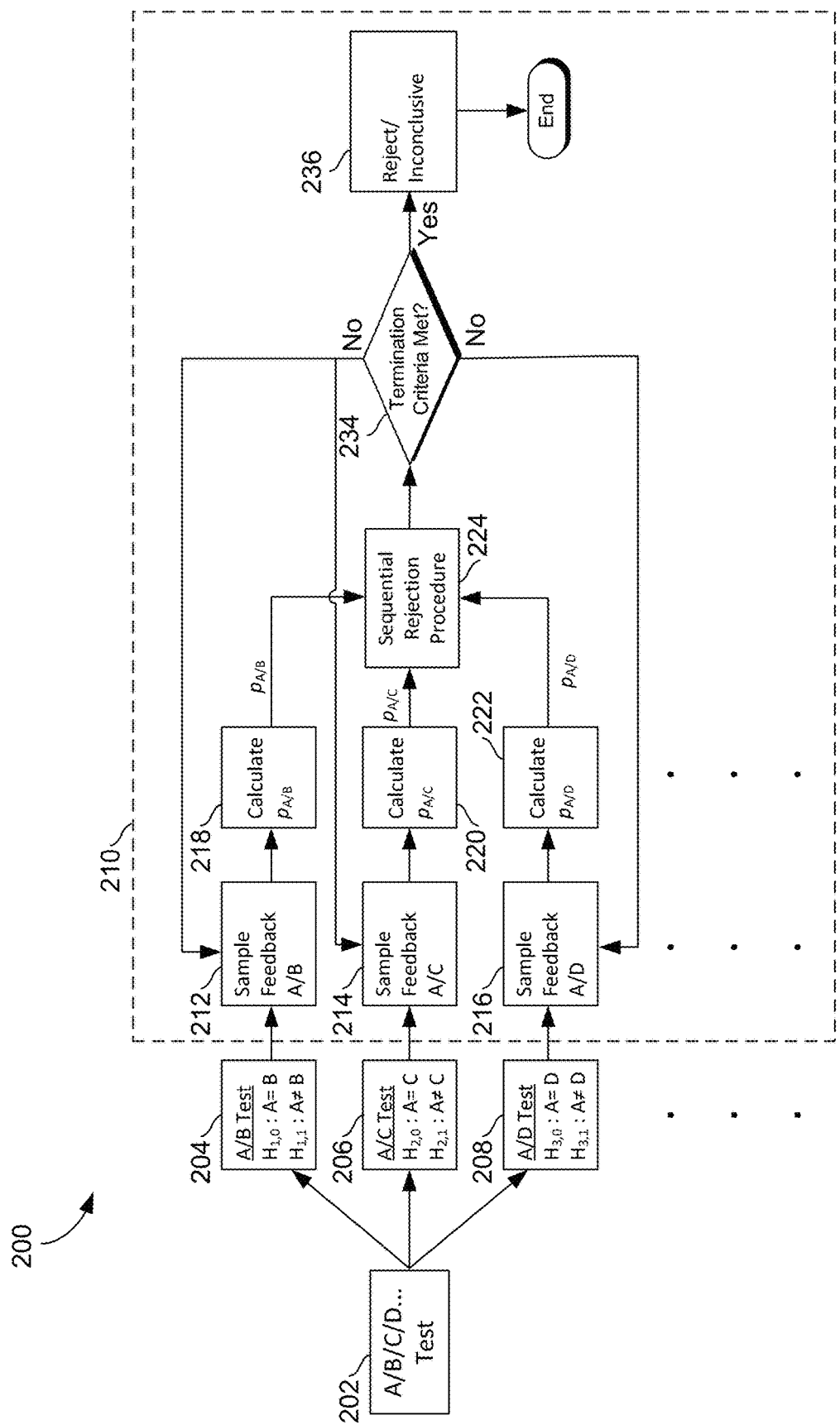
FIG. 2B depicts an illustrative sequence of procedures for performing a sequential multiple hypothesis test for single stopping, in accordance with various embodiments of the present disclosure.
Figure 3A:
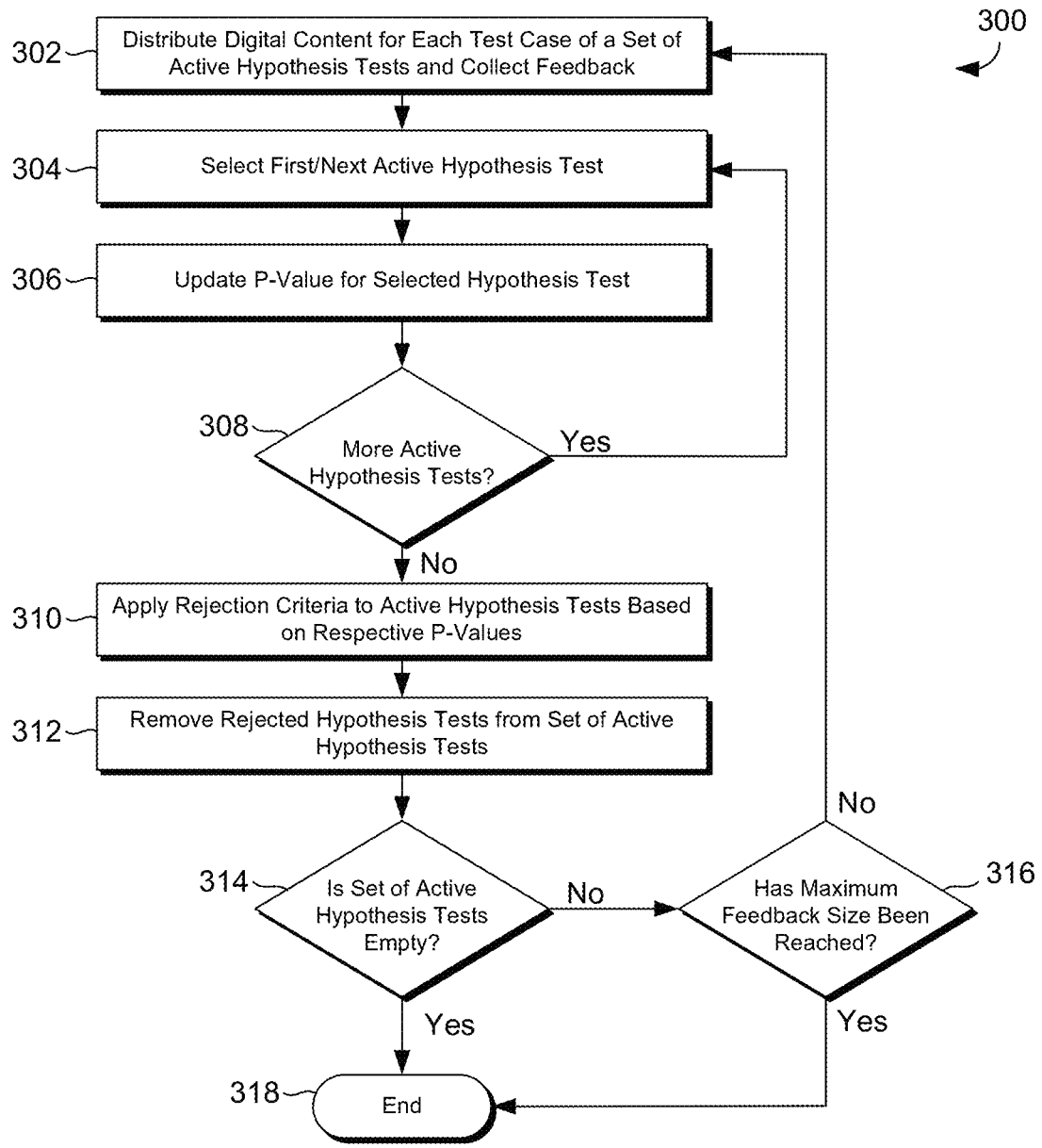
FIG. 3A illustrates a process flow depicting an example multiple hypothesis testing process for multiple stopping, in accordance with various embodiments of the present disclosure.
Figure 3B:
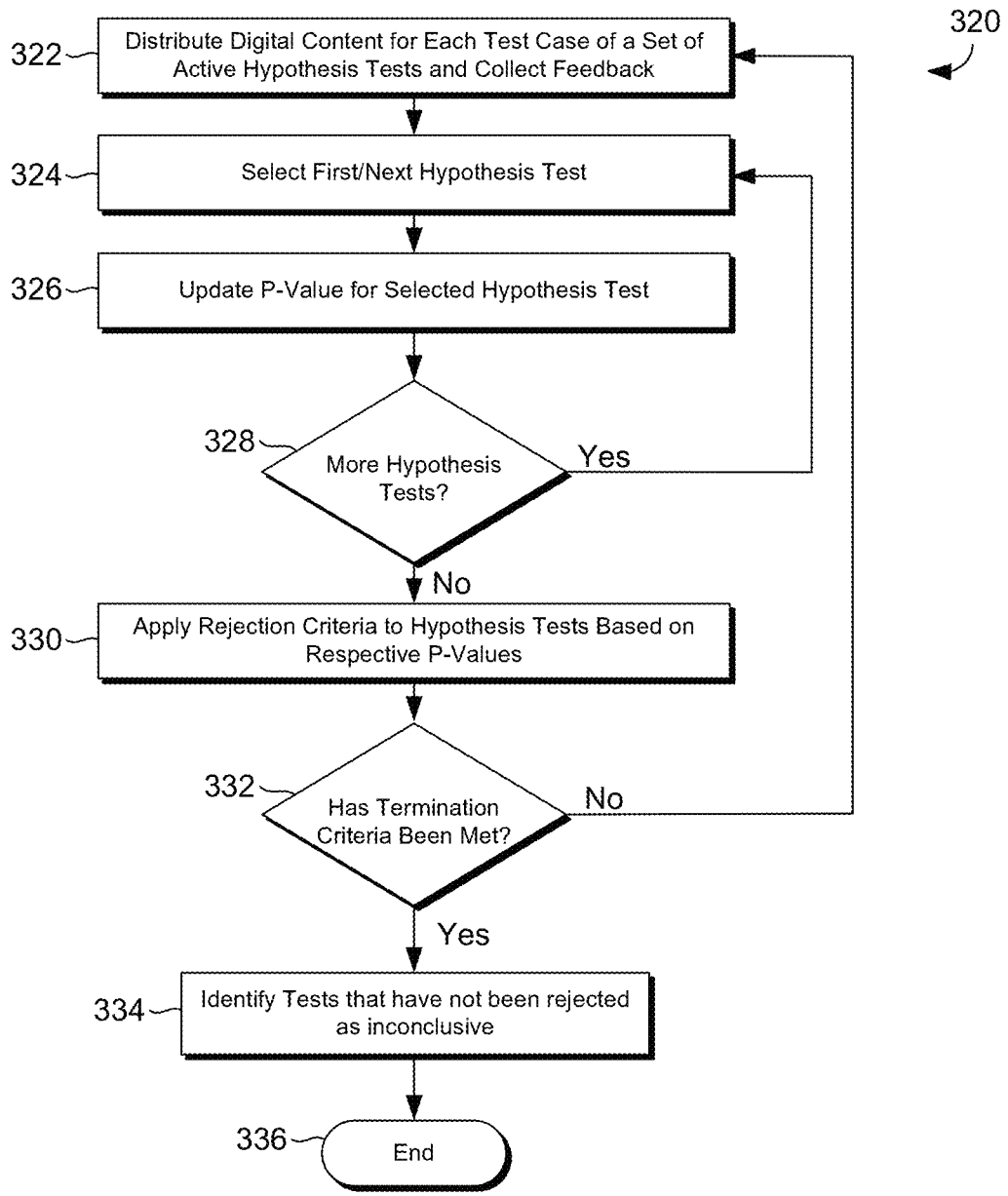
FIG. 3B illustrates a process flow depicting an example multiple hypothesis testing process for single stopping, in accordance with various embodiments of the present disclosure.

The sequential hypothesis test rejecter 114 can be configured to implement any of the above described sequential rejection procedures in a single stopping configuration or in a multiple stopping configuration. In a single stopping configuration, the multiple hypothesis test is stopped upon satisfying a stopping rule that depends on the observed feedback (e.g., when a predefined percentage of tests conclude; when a predefined number of tests have concluded, etc.). Such a stopping rule can be user defined (e.g., via input through user interface 120), programmatically defined, or defined in any other suitable manner. In the single stopping configuration, the alternative options (e.g., alternative marketing designs, medication, etc.) for concluded tests can continue to be allocated and feedback collected until the stopping rule is satisfied. Single stopping configurations are represented by FIGS. 2B, 3B, and Algorithms 1, 3, 5, 7 and 8, discussed below. Note that the single stopping configuration in sequential hypothesis testing should not be confused with fixed-horizon hypothesis testing. In fixed-horizon hypothesis testing, as explained before, the stopping time is fixed before the test begins, while in the single stopping configuration in sequential hypothesis, the stopping time is a function of the statistics and not a number that is fixed before the test begins.

In the multiple stopping configurations, the allocation of alternative options and collection of feedback is stopped as tests are concluded. As such, the multiple hypothesis test terminates once all of the hypothesis tests included therein have concluded or once a maximum sample size 'N' is reached, at which point the non-concluded tests can be considered to be affirmed. The maximum sample size N represents the number of samples to provide for the desired Power (i.e. 1–β). Multiple stopping configurations are represented by FIGS. 2A, 3A, and Algorithms 2, 4, 6, 9 and 10, discussed below.

Figure 2A:
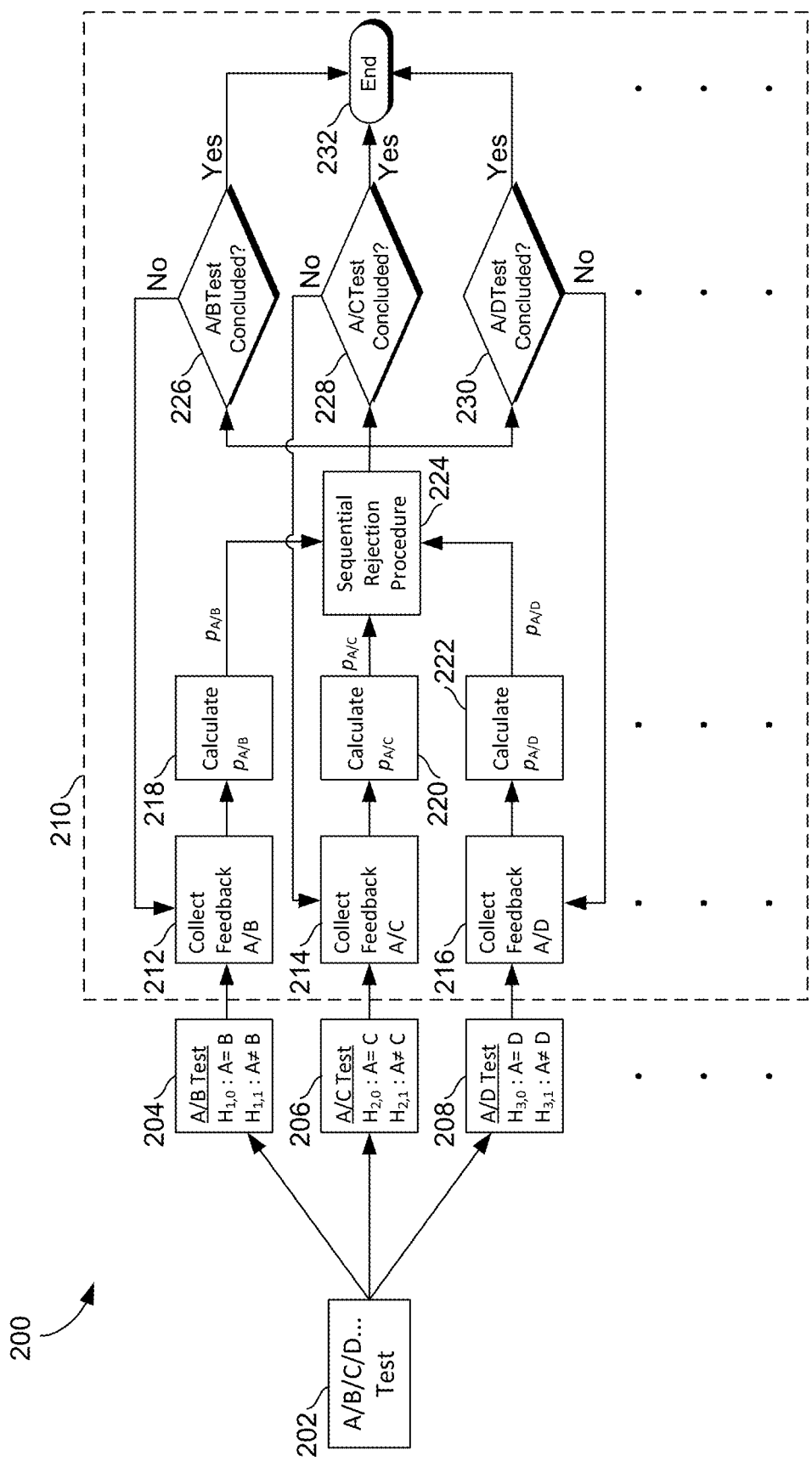
FIG. 2A depicts an illustrative sequence of procedures for performing a sequential multiple hypothesis test for multiple stopping, in accordance with various embodiments of the present disclosure.

Moving to FIG. 2A, this figure depicts an illustrative schematic 200 of procedures for performing a sequential multiple hypothesis test for a multiple stopping configuration, in accordance with various embodiments of the present disclosure. The procedures depicted within block 210 could be carried out, for example, by hypothesis testing system 108. The procedures outside of block 210 could be carried out, for example, by a user (e.g., test administrator).

The input to sequence 200 is a multiple hypothesis test 202. As depicted, multiple hypothesis test 202 can be divided into a plurality of hypothesis tests 204-208, each having a null hypothesis (i.e., $H_{1,0}$, $H_{2,0}$, $H_{3,0}$) and an alternative hypothesis (i.e., $H_{1,1}$, $H_{2,1}$, $H_{3,1}$). In embodiments, each of hypothesis tests may also include a sequential statistic mechanism (not depicted), such as that discussed in reference to FIG. 1.

Moving forward in schematic 200, at procedures 212-216, in response to distribution (e.g., via test distributor 110 of FIG. 1) of the base option A, and alternative options B/C/D/ . . . , feedback for hypothesis tests 204-208 is collected. In some embodiments, respective instances of feedback for base option A may be collected for each of procedures 212-216 (e.g., a one-to-one relationship between feedback for base option A and feedback for each of the alternative options). In other embodiments, a single instance of feedback for base option A may be collected for all of procedures 212-216 (e.g., a one-to-many relationship between feedback for base option A and feedback for each of the alternative options). As described in FIG. 1, the feedback can be automatically collected by a feedback collector (e.g., feedback collector 112).

At procedures 218-222, a p-value is calculated for each of the hypothesis tests. Such a p-value can be calculated based on a sequential statistic value that is produced by the aforementioned sequential statistic mechanism utilizing the feedback collected at blocks 212-216. In embodiments, the p-value can be defined to be in an inverse relationship with the sequential statistic value, as depicted by Equation 4, above.

Once the p-values have been calculated by procedures 218-222 for the respective hypothesis tests, the resulting p-values can be utilized as input to sequential rejection procedure 224. Sequential rejection procedure can be configured to control the rejection of the individual hypothesis tests of the multiple hypothesis test to ensure a desired FWER and/or FDR is achieved. Sequential rejection procedure 224 can utilize the p-value for each hypothesis test to determine if any of hypothesis tests 204-208 satisfy the rejection procedure. In various embodiments, sequential rejection procedure 224 can utilize any one of the sequential Bonferroni rejection procedure, the sequential Holm rejection procedure, the sequential Hochberg rejection procedure, or the sequential Benjamin-Hochberg rejection procedure, discussed above in reference to FIG. 1. The results of the sequential rejection procedure 224 (e.g., whether a respective hypothesis test was rejected) can be output to logical decision procedures 226-230.

At procedures 226-230, a determination is made as to whether the respective test has been rejected, and therefore has concluded, by the sequential rejection procedure of block 224. If a hypothesis test is determined to have concluded, then the concluded test ends at 232. If the respective test has not concluded, then processing can return to 212, 214, or 216, as depicted. A process flow depicting a multiple stopping configuration is also discussed in reference to FIG. 3A. Algorithms for implementing a multiple stopping configuration for each of the sequential rejection procedures described above are discussed in reference to Algorithms 2, 4, 6, 9, and 10 presented below.

FIG. 2B depicts an alternative version of FIG. 2A illustrating a sequence of procedures for performing a sequential multiple hypothesis test in a single stopping configuration, in accordance with various embodiments of the present disclosure. As depicted, the procedures up to and including procedure 224 are similar to those described in reference to FIG. 2A. After procedure 224, the single stopping embodiment differs beginning with block 234. Block 234 is a logical decision procedure that evaluates whether criteria for terminating the multiple hypothesis test has been met. In embodiments, this criterion can be defined in terms of a stopping rule that relies on the feedback, or samples, collected by procedures 212-216 to determine if the multiple hypothesis test is to be concluded. Such a stopping rule could be based, for example, on the number, or percentage, of hypothesis tests that have reached the point of rejection, or conclusion, as determined at block 224. This stopping rule can also be referred to herein as stopping time, T. If the termination criterion is not met, the processing returns to blocks 212-216 where additional feedback is collected for each hypothesis test of the multiple hypothesis tests. If the termination criterion is met, then procedure 236 would be implemented where the tests that are determined to have concluded at procedure 224 are rejected and tests that have yet to conclude are determined to be inconclusive. A process flow depicting a single stopping configuration is also discussed in reference to FIG. 3B. Algorithms for implementing a single stopping configuration for each of the sequential rejection procedures described above are discussed in reference to Algorithms 1, 3, 5, 7, and 8 presented below.

FIG. 3A illustrates a process flow 300 for performing an example multiple hypothesis testing process for a multiple stopping embodiment, in accordance with various embodiments of the present disclosure. Process flow 300 could be carried out, for example by hypothesis testing system 108.

As depicted, process flow 300 begins at block 302 where digital content for each test case (i.e., base case and alternative cases) of a set of active hypothesis tests is distributed and feedback is collected. This can be accomplished, for example, by test distributor 110 and feedback collector 112 described in detail in reference to FIG. 1. The set of active hypothesis tests being of a multiple hypothesis test that is being processed through process flow 300. As described in FIG. 1, the digital content can be distributed automatically and the corresponding feedback can be collected automatically.

At block 304, a first active hypothesis test is selected from the set of active hypothesis tests. A p-value for the selected hypothesis test is then updated at block 306. In embodiments, the p-value is updated in accordance with Equation 4, discussed above in reference to FIG. 1. A sample process flow for updating p-values is described in reference to FIG. 4, below.

At block 308 a determination is made as to whether any more active hypothesis tests have yet to be processed to have the respective p-values updated. If more active hypothesis test have yet to be processed, the processing returns to block 304 where a next active hypothesis test is selected and the above described procedures are repeated the newly selected hypothesis test.

Once p-values have been updated for all hypothesis tests in the active set of hypothesis tests, processing can proceed to block 310 where rejection criteria is applied to the active hypothesis tests based on the p-values updated at block 306. This rejection criteria can include a sequential rejection procedure that controls the rejection of the individual hypothesis tests of the multiple hypothesis test to ensure a desired FWER or FDR is achieved. In embodiments, the rejection criteria can include any one of the sequential Bonferroni rejection procedure, the sequential Holm rejection procedure, the sequential Hochberg rejection procedure, or the sequential Benjamin-Hochberg rejection procedure, discussed above in reference to FIG. 1. Moving to block 312, any hypothesis tests that were rejected by the rejection criteria at block 310 can be removed from the set of active hypothesis tests.

At block 314 a determination is made as to whether the set of active hypothesis tests is empty. If the set of active hypothesis tests is empty, then processing can proceed to block 318 where process flow 300 ends. If, on the other hand, the set of active hypothesis tests is not empty, processing can proceed to block 316. At block 316, a determination is made as to whether a maximum feedback, or sample, size has been reached. Such a maximum feedback size can be selected, as described previously, to achieve a desired statistical Power (i.e., 1–β). If the maximum feedback size has not been reached, then the processing returns to block 302 where the above described process flow 300 starts over. If, on the other hand, the maximum feedback size has been reached, then processing can proceed to block 318 where process flow 300 ends.

FIG. 3B illustrates a process flow 320 depicting an example multiple hypothesis testing process for single stopping, in accordance with various embodiments of the present disclosure. Process flow 320 could be carried out, for example by hypothesis testing system 108.

As depicted, process flow 320 begins at block 322 where digital content for each test case (i.e., base case and alternative cases) of a set of hypothesis tests is distributed and feedback is collected. This can be accomplished, for example, by test distributor 110 and feedback collector 112 described in detail in reference to FIG. 1. The set of hypothesis tests being of a multiple hypothesis test that is being processed through process flow 320. As described in FIG. 1, the digital content can be distributed automatically and the corresponding feedback can be collected automatically.

At block 324, a first hypothesis test is selected from the set of hypothesis tests. A p-value for the selected hypothesis test is then updated at block 326. In embodiments, the p-value is updated in accordance with Equation 4, discussed above in reference to FIG. 1. At block 328 a determination is made as to whether any more active hypothesis tests have yet to be processed. If more hypothesis test have yet to be processed, the processing returns to block 324 where a next hypothesis test is selected and the above described procedures are repeated with the newly selected hypothesis test. A sample process flow for updating p-values is described in reference to FIG. 4, below.

Once p-values have been updated for all hypothesis tests in the set of hypothesis tests, processing can proceed to block 330 where rejection criteria is applied to the hypothesis tests based on the p-values updated at block 326. This rejection criteria can include a sequential rejection procedure that controls the rejection of the individual hypothesis tests of the multiple hypothesis test to ensure a desired FWER or FDR is achieved. In embodiments, the rejection criteria can include any one of the sequential Bonferroni rejection procedure, the sequential Holm rejection procedure, the sequential Hochberg rejection procedure, or the sequential Benjamin-Hochberg rejection procedure, discussed above in reference to FIG. 1.

Moving to block 332, at block 332 a determination is made as to whether criteria for terminating the multiple hypothesis test has been met. In embodiments, this criteria can be defined in terms of a stopping rule that relies on the feedback, or samples, collected at block 322 to determine if the multiple hypothesis test is to be concluded. Such a stopping rule could be based, for example, on the number, or percentage, of hypothesis tests that have reached the point of rejection, or conclusion, as determined at block 330. This stopping rule can also be referred to herein as stopping time, T. If the termination criteria is not met, the processing returns to blocks 322 where the above described process is repeated. If, on the other hand, the termination criteria has been met, then the processing can proceed to block 334 where those hypothesis tests that have yet to be rejected can be identified as being inconclusive. From block 334, process flow 320 proceeds to block 336 where the process ends.

Figure 4:
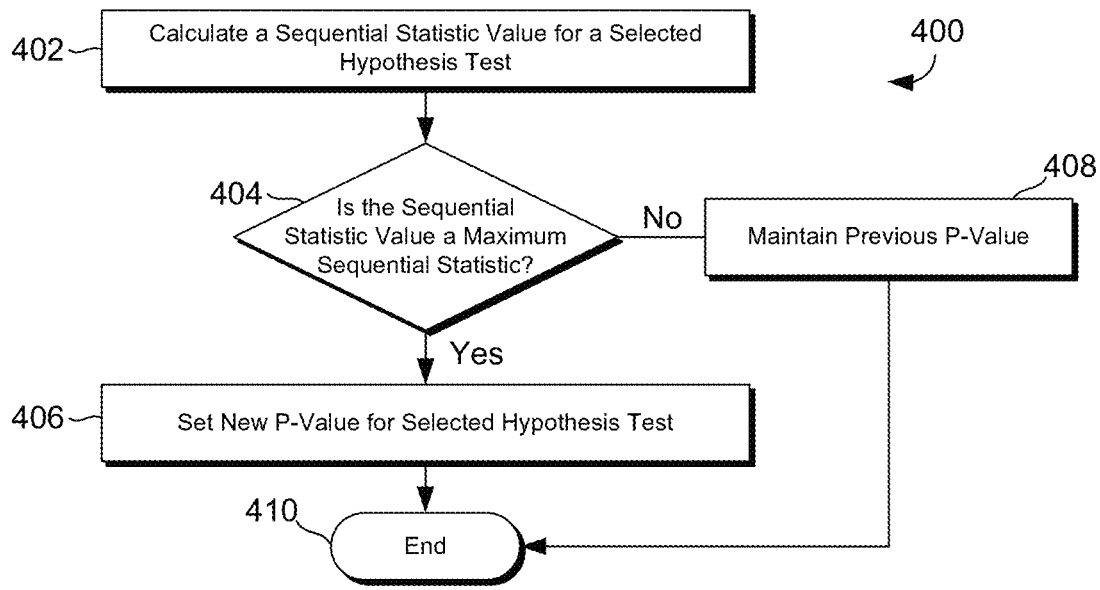
FIG. 4 illustrates a process flow depicting an example process for updating a p-value for a selected hypothesis test, in accordance with various embodiments of the present disclosure.

FIG. 4 illustrates a process flow depicting an example process for updating a p-value for a selected hypothesis test, in accordance with various embodiments of the present disclosure. Process flow 400 could be carried out, for example, as part of procedures 218-222 of FIGS. 2A & B or either of blocks 310 or 330 of FIGS. 3A & B. Process flow 400 begins at block 402 where a sequential statistic is calculated for a selected hypothesis test (e.g., the hypothesis test selected at block 304 or 328 of FIGS. 3A & B). At block 404, a determination is made as to whether the sequential statistic value from block 402 represents a maximum sequential statistic (i.e., largest sequential statistic value) for the selected hypothesis test. If the sequential statistic value is not a maximum sequential statistic, then the processing can proceed to block 408 where a p-value from a previous iteration is maintained. The process would then proceed from block 408 to block 410, where the process would end. If, on the other hand, the sequential statistic value is a maximum sequential statistic, then the processing can proceed to block 406 where a new p-value is set for the selected hypothesis test based on the maximum sequential statistic. Such a p-value can be set in accordance with Equation 4, discussed above in reference to FIG. 1. Once the new p-value is set, the process can proceed from block 406 to block 410 where the process can end.

Figure 5:
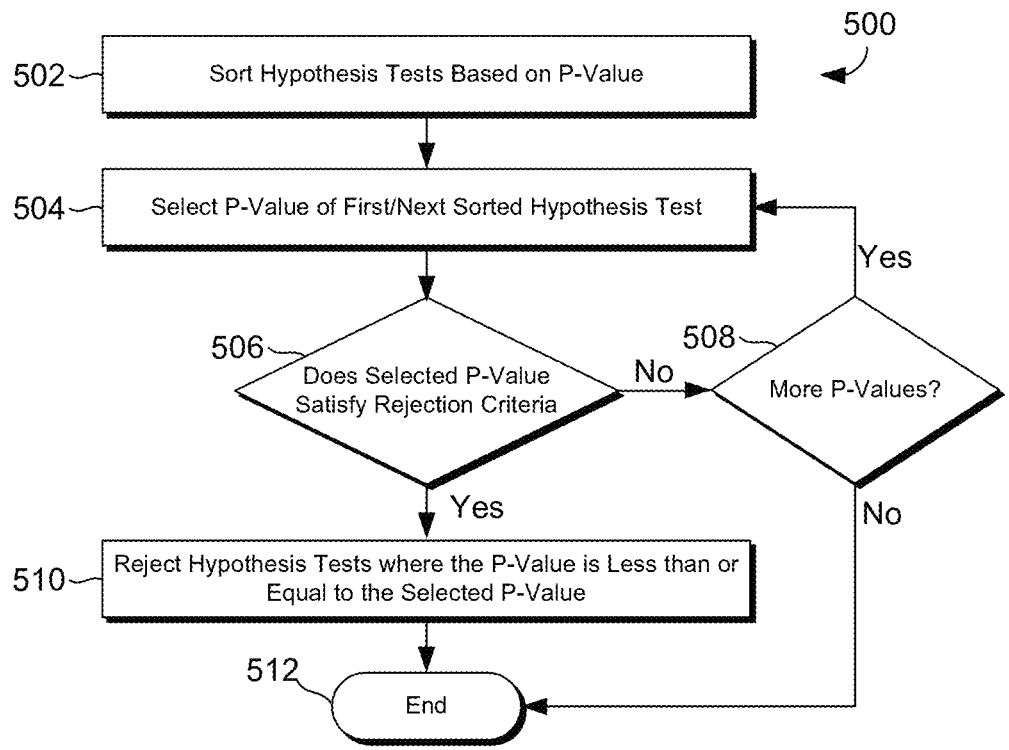
FIG. 5 illustrates a process flow depicting an example process for applying rejection criterion for a sequential multiple hypothesis test, in accordance with various embodiments of the present disclosure.

FIG. 5 illustrates a process flow depicting an example process for applying rejection criteria for a sequential multiple hypothesis test, in accordance with various embodiments of the present disclosure. Process flow 500 can be carried out by, for example, hypothesis testing system 108 of FIG. 1. Process flow 500 can be implemented, for example, as part of sequential rejection procedure 224 of FIG. 2A or 2B, block 306 of FIG. 3A, or block 326 of FIG. 3B.

Process flow 500 begins at block 502 where the hypothesis tests are sorted in ascending order based on the respective p-values of the hypothesis tests. At block 504 a first p-value, of the sorted p-values, is selected. This rejection criteria can include the sequential Holm rejection procedure (Equation 6), the sequential Hochberg rejection procedure (Equation 7), or the sequential Benjamin-Hochberg rejection procedure (Equation 8). A determination is then made as to whether the selected p-value satisfies the rejection criteria at block 506. If the selected p-value does satisfy the rejection criteria, then processing proceeds to block 510 where, in embodiments utilizing the sequential Hochberg rejection procedure or the sequential Benjamin-Hochberg rejection procedure, the hypothesis tests with a p-value that is less than or equal to the selected p-value are rejected. In the case of the sequential Holm rejection procedure, the hypothesis tests with a p-value that is less than the selected p-value are rejected. If the selected p-value does not satisfy the rejection criteria, then the processing moves to block 508 where a determination is made as to whether any more p-values exist. If no more p-values exist, then the process proceeds to block 512 where the process ends. If there are more p-values then the process returns to block 504 where a next p-value is selected from the sorted p-values.

Sample Algorithms

The following sample algorithms depict illustrative pseudo-code for implementing embodiments described above. It will be appreciated that these sample algorithms present example implementations that are meant to be illustrative and are not intended to limit this disclosure. Each algorithm includes line numbers as the left-most character of each line of the algorithm. Reference is made to some of these line numbers in an effort to explain the process depicted by each algorithm. Discussions for each algorithm are included immediately following the algorithm.

---

Algorithm 1: Sequential Bonferroni Procedure (Single Stopping)

---

1: Input: stopping time T
2: Input: Sequential p-values $p_1, \ldots, p_m$ corresponding to tests $1, \ldots, m$
3: for n = 1, 2, ... do
4:   Draw one sample from each variation $j \in S$
5:   Update all $p_j(n)$
6:   if Stopping time T is reached then
7:     break
8:   end if
9: end for
10: Reject all tests with $p_j(T) \leq \dfrac{\alpha}{m}$

---

Algorithm 1 depicts the pseudo-code of an illustrative multiple hypothesis test using a sequential Bonferroni rejection procedure in a single stopping configuration. As depicted, Algorithm 1 takes as input a stopping time, T. In embodiments, stopping time, T, is defined in terms of a stopping rule that relies on the feedback, or samples, collected. Such a stopping rule could be based, for example, on the number, or percentage, of hypothesis tests that have reached the point of rejection, or conclusion. As such, because Algorithm 1 depicts a sequential Bonferroni stopping procedure, the stopping time T could be based on the number, or percentage, of hypothesis tests that satisfy the sequential Bonferroni rejection procedure as defined by Equation 5. Algorithm 1 also takes as input equations (e.g., Equation 4) for sequential p-values, $p_1, \ldots, p_m$, for hypothesis tests $1, \ldots, m$ of a set of hypothesis tests, S, of the multiple hypothesis test being processed (e.g., multiple hypothesis test 102 of FIG. 1, 202 of FIGS. 2A & 2B).

As can be seen, Algorithm 1 iteratively samples all hypothesis tests j of the set of hypothesis tests S at line 4. Algorithm 1 then updates the sequential p-values for each hypothesis test at line 5. At line 6, a determination is made as to whether the stopping time T has been reached (e.g., the number, or percentage, of tests that satisfies the sequential Bonferroni rejection procedure has been met). If the stopping time T has not been reached, then the next iteration begins and processing returns to line 3. If the stopping time T has been reached, then the iterations end and the sequential Bonferroni rejection procedure is applied to all hypothesis tests at line 10. Any hypothesis tests that are not rejected at line 10 would be considered to be inconclusive.

Algorithm 2: Sequential Bonferroni Procedure (Multiple Stopping)

1: Input: maximum sample size N
2: Input: Sequential p-values $p_1, \ldots, p_m$, corresponding to tests $1, \ldots, m$
3: Initialize: Active p-values $S = \{1, \ldots, m\}$
4: for $n = 1, 2, \ldots, N$, do
5:     Draw one sample from each variation $j \in S$
6:     Update all $p_j(n)$ for $j \in S$
7:     Set $p_j(n) = p_j(n-1)$ for all $j \notin S$
8:     
$$\text{Set } S = J \setminus \left\{ j : p_j(n) \leq \frac{\alpha}{m} \right\}$$

9:     if $S = \emptyset$ then
10:        break
11:    end if
12: end for
13: Reject all tests $j \in J/S$, the compliment of S.

Algorithm 2 depicts the pseudo-code for an illustrative multiple hypothesis test using a sequential Bonferroni rejection procedure in a multiple stopping configuration. As depicted, Algorithm 2 takes as input a maximum sample size N. In embodiments, maximum sample size N is defined, as described in detail above, such that a desired statistical Power (e.g., $1-\beta$) is satisfied by the time N is reached. As can be seen in line 4, Algorithm 2 iterates until this maximum sample size N is reached, unless all tests are concluded prior to reaching N, as discussed below in reference to line 9. Algorithm 2 also takes as input equations (e.g., Equation 4) of sequential p-values, $p_1, \ldots, p_m$ for hypothesis tests $j \in J = \{1, \ldots, m\}$ of a multiple hypothesis test (e.g., multiple hypothesis test 102 of FIG. 1, 202 of FIGS. 2A & 2B).

At line 3, an active set of hypothesis tests are initialized as active set S. It will be appreciated that, at the point in time in which line 3 is executed, all hypothesis tests $1, \ldots, m$ are active. As such, when initialized, S=J. As can be seen, Algorithm 2 then iteratively samples all hypothesis tests j of the active set S at line 5. Algorithm 2 then updates the sequential p-values for all hypothesis tests j of the active set S at line 6. At line 7, all hypothesis tests, j, that are not in the active set S, are set to maintain their corresponding p-values from the previous iteration, n−1. As such, once concluded, the p-value for a test does not change. At line 8, the active set S is set to equal J with those hypothesis tests whose p-values satisfy the sequential Bonferroni stopping procedure removed. To put it another way, line 8 removes those hypothesis tests from the active set S that satisfy the sequential Bonferroni stopping procedure. As such, after line 8 active set S only includes those hypothesis tests that have not yet satisfied the sequential Bonferroni stopping procedure. At line 9, a determination is made as to whether the active set S is empty, or a null set (e.g., all hypothesis tests have terminated). If the active set S is empty, then iterative processing stops and all tests are rejected at line 13. If the active set S is not empty, and maximum sample size N has not been reached, then the processing would return to line 4 where the iterative processing would continue. Once the maximum sample size, N, is reached, the iterative processing will stop and any tests in J that are not in S are rejected at line 13. The tests that are still considered active can be considered to have been affirmed.

Algorithm 3: Sequential Holm Procedure (Single Stopping)

1: Input: stopping time T
2: Input: Sequential p-values $p_1, \ldots, p_m$ corresponding to tests $1, \ldots, m$
3: for $n = 1, 2, \ldots$ do
4:     Draw one sample from each variation $j \in S$
5:     Update all $p_j(n)$
6:     if Stopping time T is reached then
7:        break
8:     end if
9: end for
10: Sort the p-values; i.e., $p_{(1)}(n) \leq p_{(2)}(n) \leq \ldots \leq p_{(m)}(n)$
11: Set $j^* = 0$
12: for $j = 1, \ldots, m$ do
13:    
$$\text{if } p_{(j)}(n) \geq \frac{\alpha}{m+1-j} \text{ then}$$

14:        break
15:    else
16:        Set $j^* \leftarrow j^* + 1$
17:    end if
18: end for
19: Reject all tests with $p_j(T) \leq p_{j^*}(T)$.

Algorithm 3 depicts the pseudo-code for an illustrative multiple hypothesis test using a sequential Holm rejection procedure in a single stopping configuration. As depicted, Algorithm 3 takes as input a stopping time, T. As with Algorithm 1, stopping time, T, is defined in terms of a stopping rule. Such a stopping rule could be based, for example, on the number, or percentage, of hypothesis tests that have reached the point of rejection. As such, because Algorithm 3 is depicting a sequential Holm stopping procedure, the stopping time T could be based on the number, or percentage, of hypothesis tests that satisfy the sequential Holm rejection procedure as defined by Equation 6. Algorithm 3 also takes as input equations (e.g., Equation 4) for sequential p-values, $p_1, \ldots, p_m$ for hypothesis tests $1, \ldots, m$ of a multiple hypothesis test S (e.g., multiple hypothesis test 102 of FIG. 1, 202 of FIGS. 2A & 2B).

As can be seen, Algorithm 3 iteratively samples all hypothesis tests j of the multiple hypothesis test S at Line 4. Algorithm 3 then updates the sequential p-values for each hypothesis test at line 5. At Line 6, a determination is made as to whether the stopping time T has been reached (e.g., the number, or percentage, of tests that satisfy the sequential Bonferroni rejection procedure has been met). If the stopping time T has not been reached, then the next iteration begins and processing returns to line 3. If the stopping time T has been reached, then the iterations end and the sequential Holm rejection procedure is applied to all hypothesis tests starting at line 10. At line 10, the p-values for the hypothesis tests being analyzed that were produced by the iterative processing of lines 3-9 are sorted into ascending order. Line 11 initializes a variable, j*, to zero. Lines 12-17 iterate through the ordered p-values to determine if any of the p-values satisfy the sequential Holm rejection procedure applied at line 13. If a p-value does not satisfy the sequential Holm rejection procedure at line 13, then processing moves to line 16 where j* is incremented and the iterative processing returns to line 12. If a p-value does satisfy the sequential Holm rejection procedure applied at line 13, then the iterative processing of lines 12-18 terminates and processing proceeds to line 19. At line 19, all hypothesis tests whose p-value is less than or equal to the p-value of the hypothesis test for index j* are rejected. Any hypothesis tests that are not rejected at line 19 would be considered to be inconclusive.

---
Algorithm 4: Sequential Holm Procedure (Multiple Stopping)
---
1: Input: maximum sample size N
2: Input: Sequential p-values $p_1, \ldots, p_m$ corresponding to tests $1, \ldots, m$
3: Initialize: Active p-values $S = \{1, \ldots, m\}$
4: for $n = 1, 2, \ldots, N$ do
5:    Draw one sample from each variation $j \in S$
6:    Update all $p_j(n)$ for $j \in S$
7:    Set $p_j(n) = p_j(n-1)$ for all $j \notin S$
8:    Sort the p-values; i.e., $p_{(1)}(n) \leq p_{(2)}(n) \leq \ldots \leq p_{(m)}(n)$
9:    Set $j^* = 0$
10:    for $j = 1, \ldots, m-1, m$ do
11:      if $p_{(j)}(n) \geq \dfrac{\alpha}{m+1-j}$ then
12:        break
13:      else
14:        Set $j^* \leftarrow j^* + 1$
15:      end if
16:    end for
17:    if $j^* \neq 0$ then
18:      Remove all tests $j$ with $p_j(n) \leq p_{(j^*)}(n)$ from S
19:    end if
20:    if $S = \emptyset$ then
21:      break
22:    end if
23: end for
24: Reject all tests $j \in J/S$, the compliment of S.
---

Algorithm 4 depicts the pseudo-code of an illustrative multiple hypothesis test using a sequential Holm rejection procedure in a multiple stopping configuration. As depicted, Algorithm 4 takes as input a maximum sample size N. In embodiments, maximum sample size N is defined, as described in detail above, such that a desired statistical Power (e.g., $1-\beta$) is satisfied by the time N is reached. As can be seen in line 4, Algorithm 4 iterates until this maximum sample size N is reached, unless all tests are concluded prior to reaching N, as discussed below in reference to line 20. Algorithm 4 also takes as input equations (e.g., Equation 4) of sequential p-values, $p_1, \ldots, p_m$ for hypothesis tests $j \in J = \{1, \ldots, m\}$ of a multiple hypothesis test (e.g., multiple hypothesis test 102 of FIG. 1, 202 of FIGS. 2A & 2B).

At line 3, an active set of hypothesis tests are initialized as active set S. It will be appreciated that, at the point in time in which line 3 is executed, all hypothesis tests $1, \ldots, m$ are active. As such, when initialized, S=J. As can be seen, Algorithm 4 then iteratively samples all hypothesis tests $j$ of the active set S at line 5. Algorithm 4 then updates the sequential p-values for all hypothesis tests $j$ of the active set S at line 6. At line 7, all hypothesis tests, $j$, that are not in the active set S, are set to maintain the p-value from the previous iteration, n−1. As such, once concluded, the p-value for a test does not change. At line 8, the p-values for the hypothesis tests being analyzed that were produced by lines 6-7 are sorted into ascending order. Line 9 initializes a variable, $j^*$, to zero. Lines 10-16 iterate through the ordered p-values to determine if any of the p-values satisfy the sequential Holm rejection procedure applied at line 11. If a p-value does not satisfy the sequential Holm rejection procedure at line 11, then processing moves to line 14 where $j^*$ is incremented and the iterative processing returns to line 10. If a p-value does satisfy the sequential Holm rejection procedure applied at line 11, then the iterative processing of lines 10-16 terminates and processing proceeds to line 17. At line 17, if $j^*$ does not equal zero, then all hypothesis tests with p-values that are less than or equal to the p-value of the hypothesis test for index $j^*$ are removed from active set S at line 18. At line 20, a determination is made as to whether the active set S is empty, or a null set (e.g., all hypothesis tests have terminated). If the active set S is empty, then iterative processing stops and all tests are rejected at line 24. If the active set S is not empty, and maximum sample size N has not been reached, then the processing would return to line 4 where the iterative processing would continue. Once the maximum sample size, N, is reached, the iterative processing will stop and any tests in J that are not in S are rejected at line 24. The tests that are still considered active can be considered to have been affirmed.

---
Algorithm 5: Sequential Hochberg Procedure
---
1: Input: stopping time T
2: Input: Sequential p-values $p_1, \ldots, p_m$ corresponding to tests $1, \ldots, m$
3: for $n = 1, 2, \ldots$ do
4:    Draw one sample from each variation $j \in S$
5:    Update all $p_j(n)$
6:    if Stopping time T is reached then
7:      break
8:    end if
9: end for
10: Sort the p-values; i.e., $p_{(1)}(n) \leq p_{(2)}(n) \leq \ldots \leq p_{(m)}(n)$
11: Set $j^* = 0$
12: for $j = m, m-1, \ldots, 1$ do
13:    if $p_{(j)}(n) \leq \dfrac{\alpha}{m+1-j}$, then
14:      Set $j^* = j$
15:      break
16:    end if
17: end for
18: Reject all tests with $p_j(T) \leq p_{j^*}(T)$.
---

Algorithm 5 depicts the pseudo-code of an illustrative multiple hypothesis test using a sequential Hochberg rejection procedure in a single stopping configuration. As depicted, Algorithm 3 takes as input a stopping time, T. As with Algorithm 1, stopping time, T, is defined in terms of a stopping rule. Such a stopping rule could be based, for example, on the number, or percentage, of hypothesis tests that have reached the point of rejection. As such, because Algorithm 5 is depicting a sequential Hochberg rejection procedure, the stopping time T could be based on the number, or percentage, of hypothesis tests that satisfy the sequential Hochberg rejection procedure as defined by Equation 7. Algorithm 5 also takes as input equations (e.g., Equation 4) for sequential p-values, $p_1, \ldots, p_m$ for hypothesis tests $1, \ldots, m$ of a multiple hypothesis test S (e.g., multiple hypothesis test 102 of FIG. 1, 202 of FIGS. 2A & 2B).

As can be seen, Algorithm 5 iteratively samples all hypothesis tests $j$ of the multiple hypothesis test S at line 4. Algorithm 5 then updates the sequential p-values for each hypothesis test at line 5. At line 6, a determination is made as to whether the stopping time T has been reached (e.g., the number, or percentage, of tests that satisfy the sequential Bonferroni rejection procedure has been met). If the stopping time T has not been reached, then the next iteration begins and processing returns to line 3. If the stopping time T has been reached, then the iterations end and the sequential Hochberg rejection procedure is applied to all hypothesis tests starting at line 10. At line 10, the p-values for the hypothesis tests being analyzed that were produced by the iterative processing of lines 3-9 are sorted into ascending order. Line 11 initializes a variable, $j^*$, to zero. Lines 12-17 iterate through the ordered p-values, beginning with the largest p-value, to determine if any of the p-values satisfy the sequential Hochberg rejection procedure applied at line 13. If a p-value does not satisfy the sequential Hochberg rejection procedure at line 13, then the iterative processing returns to line 12. If a p-value does satisfy the sequential Hochberg rejection procedure applied at line 13, then j* is set to equal the current index j and the iterative processing of lines 12-17 terminates. Processing then proceeds to line 18. At line 18, all hypothesis tests whose p-value is less than or equal to the p-value of the hypothesis test for index j* are rejected. Any hypothesis tests that are not rejected at line 18 would be considered to be inconclusive.

---

Algorithm 6: Sequential Hochberg Procedure (multiple stopping)

1: Input: maximum sample size N
2: Input: Sequential p-values $p_1, \ldots, p_m$, corresponding to tests $1, \ldots, m$
3: Initialize: Active p-values $S = \{1, \ldots, m\}$
4: for $n = 1, 2, \ldots, N$, do
5:   Draw one sample from each variation $j \in S$
6:   Update all $p_j(n)$ for $j \in S$
7:   Set $p_j(n) = p_j(n-1)$ for all $j \notin S$
8:   Sort the p-values; i.e., $p_{(1)}(n) \leq p_{(2)}(n) \leq \ldots \leq p_{(m)}(n)$
9:   Set $j^* = 0$
10:   for $j = m, m-1, \ldots, 1$ do
11:     if $p_{(j)}(n) \leq \dfrac{\alpha}{m+1-j}$ then
12:       Set $j^* = j$
13:       break
14:     end if
15:   end for
16:   if $j^* \neq 0$ then
17:     Remove all tests j with $p_j(n) \leq p_{(j^*)}(n)$ from S
18:   end if
19:   if $S = \emptyset$ then
20:     break
21:   end if
22: end for
23: Reject all tests $j \in J/S$, the compliment of S.

---

Algorithm 6 depicts the pseudo-code for an illustrative multiple hypothesis test using a sequential Hochberg rejection procedure in a multiple stopping configuration. As depicted, Algorithm 6 takes as input a maximum sample size N. In embodiments, maximum sample size N is defined, as described in detail above, such that a desired statistical Power (e.g., $1-\beta$) is satisfied by the time N is reached. As can be seen in line 4, Algorithm 6 iterates until this maximum sample size N is reached, unless all tests are concluded prior to reaching N, as discussed below in reference to line 19. Algorithm 6 also takes as input equations (e.g., Equation 4) of sequential p-values, $p_1, \ldots, p_m$ for hypothesis tests $j \in J = \{1, \ldots, m\}$ of a multiple hypothesis test (e.g., multiple hypothesis test 102 of FIG. 1, 202 of FIGS. 2A & 2B).

At line 3, an active set of hypothesis tests are initialized as active set S. It will be appreciated that, at the point in time in which line 3 is executed, all hypothesis tests $1, \ldots, m$ are active. As such, when initialized, S=J. As can be seen, Algorithm 6 then iteratively samples all hypothesis tests j of the active set S at line 5. Algorithm 6 then updates the sequential p-values for all hypothesis tests j of the active set S at line 6. At line 7, all hypothesis tests, j, that are not in the active set S, are set to maintain the p-value from the previous iteration, n−1. As such, once concluded, the p-value for a test does not change. At line 8, the p-values for the hypothesis tests being analyzed that were produced by lines 6-7 are sorted into ascending order. Line 9 initializes a variable, j*, to zero. Lines 10-15 iterate through the ordered p-values, beginning with the largest p-value, to determine if any of the p-values satisfy the sequential Hochberg rejection procedure applied at line 11. If a p-value does not satisfy the sequential Holm rejection procedure at line 11, then processing moves to line 16. If a p-value does satisfy the sequential Hochberg rejection procedure applied at line 11, then the iterative processing of lines 10-15 terminates and processing proceeds to line 16. At line 16, if j* does not equal zero, then all hypothesis tests with p-values that are less than or equal to the p-value of the hypothesis test for index j* are removed from active set S at line 17. At line 19, a determination is made as to whether the active set S is empty, or a null set (e.g., all hypothesis tests have terminated). If the active set S is empty, then iterative processing stops and all tests are rejected at line 23. If the active set S is not empty, and maximum sample size N has not been reached, then the processing would return to line 4 where the iterative processing would continue. Once the maximum sample size, N, is reached, the iterative processing will stop and any tests in J that are not in S are rejected at line 23. The tests that are still considered active can be considered to have been affirmed.

---

Algorithm 7: Sequential Benjamin-Hochberg Procedure (Single Stopping without Correction)

1: Input: stopping time T
2: Input: Sequential p-values $p_1, \ldots, p_m$ corresponding to tests $1, \ldots, m$
3: for $n = 1, 2, \ldots$ do
4:   Draw one sample from each variation $j \in S$
5:   Update all $p_j(n)$
6:   if Stopping time T is reached then
7:     break
8:   end if
9: end for
10: Sort the p-values; i.e., $p_{(1)}(n) \leq p_{(2)}(n) \leq \ldots \leq p_{(m)}(n)$
11: Set $j^* = 0$
12: for $j = m, m-1, \ldots, 1$ do
13:   if $p_{(j)}(n) \leq \dfrac{j\alpha}{m}$ then
14:     Set $j^* = j$
15:     break
16:   end if
17: end for
18: Reject all tests with $p_j(T) \leq p_{j^*}(T)$.

---

Algorithm 7 depicts the pseudo-code of an illustrative multiple hypothesis test using a sequential Benjamin-Hochberg rejection procedure in a single stopping configuration without correction. As depicted, Algorithm 7 takes as input a stopping time, T. As with Algorithm 1, stopping time, T, is defined in terms of a stopping rule. Such a stopping rule could be based, for example, on the number, or percentage, of hypothesis tests that have reached the point of rejection. As such, because Algorithm 7 is depicting a sequential Benjamin-Hochberg rejection procedure, the stopping time T could be based on the number, or percentage, of hypothesis tests that satisfy the sequential Hochberg rejection procedure as defined by Equation 8. Algorithm 7 also takes as input equations (e.g., Equation 4) for sequential p-values, $p_1, \ldots, p_m$ for hypothesis tests $1, \ldots, m$ of a multiple hypothesis test S (e.g., multiple hypothesis test 102 of FIG. 1, 202 of FIGS. 2A & 2B).

As can be seen, Algorithm 7 iteratively samples all hypothesis tests j of the multiple hypothesis test S at line 4. Algorithm 7 then updates the sequential p-values for each hypothesis test at line 5. At line 6, a determination is made as to whether the stopping time T has been reached (e.g., the number, or percentage, of tests that satisfy the sequential Bonferroni rejection procedure has been met). If the stopping time T has not been reached, then the next iteration begins and processing returns to line 3. If the stopping time T has been reached, then the iterations end and the sequential Benjamin-Hochberg rejection procedure is applied to all hypothesis tests starting at line 10. At line 10, the p-values for the hypothesis tests being analyzed that were produced by the iterative processing of lines 3-9 are sorted into ascending order. Line 11 initializes a variable, j*, to zero. Lines 12-17 iterate through the ordered p-values, beginning with the largest p-value, to determine if any of the p-values satisfy the sequential Benjamin-Hochberg rejection procedure applied at line 13. If a p-value does not satisfy the sequential Hochberg rejection procedure at line 13, then the iterative processing returns to line 12. If a p-value does satisfy the sequential Benjamin-Hochberg rejection procedure applied at line 13, then j* is set to equal the current index j and the iterative processing of lines 12-17 terminates. Processing then proceeds to line 18. At line 18, all hypothesis tests whose p-value is less than or equal to the p-value of the hypothesis test for index j* are rejected. Any hypothesis tests that are not rejected at line 18 would be considered to be inconclusive.

Algorithm 8: Sequential Benjamin-Hochberg Procedure
(Single Stopping with Correction)

1: Input: stopping time T
2: Input: Sequential p-values $p_1, \ldots, p_m$ corresponding to tests $1, \ldots, m$
3:
$$\text{Initialize: } m' = m \sum_{j=1}^{m} \frac{1}{j}$$
4: for n = 1, 2, ... do
5:   Draw one sample from each variation j ∈ S
6:   Update all $p_j(n)$
7:   if Stopping time T is reached then
8:     break
9:   end if
10: end for
11: Sort the p-values; i.e., $p_{(1)}(n) \leq p_{(2)}(n) \leq \ldots \leq p_{(m)}(n)$
12: Set j* = 0
13: for j = m, m − 1, ..., 1 do
14:
$$\text{if } p_{(j)}(n) \leq \frac{j\alpha}{m'}, \text{ then}$$
15:   Set j* = j
16:   break
17:   end if
18: end for
19: Reject all tests with $p_j(T) \leq p_{j*}(T)$.

Algorithm 8 depicts the pseudo-code for an illustrative multiple hypothesis test using a sequential Benjamin-Hochberg rejection procedure in a single stopping configuration with correction. As depicted, Algorithm 8 is essentially the same as Algorithm 7, except there is a correction factor, m', utilized in the Benjamin-Hochberg rejection procedure at line 14, rather than m utilized at line 13 in Algorithm 7. Other than utilizing m', Algorithm 8 and Algorithm 7 function in a substantially similar manner. As such, the function described above in reference to Algorithm 7 can also be applied to Algorithm 8. As can be seen, m' is initialized at line 3, as such, all line references described in reference to Algorithm 7 would be incremented by 1, after line 3, when being applied to Algorithm 8.

Algorithm 9: Sequential Benjamin-Hochberg Procedure
(Multiple Stopping without Correction)

1: Input: maximum sample size N
2: Input: Sequential p-values $p_1, \ldots, p_m$, corresponding to tests $1, \ldots, m$
3: Initialize: Active p-values S = {1, ..., m}
4: for n = 1, 2, ..., N, do
5:   Draw one sample from each variation j ∈ S
6:   Update all $p_j(n)$ for j ∈ S
7:   Set $p_j(n) = p_j(n - 1)$ for all j ∉ S
8:   Sort the p-values; i.e., $p_{(1)}(n) \leq p_{(2)}(n) \leq \ldots \leq p_{(m)}(n)$
9:   Set j* = 0
10:  for j = m, m − 1, ..., 1 do
11:
$$\text{if } p_{(j)}(n) \leq \frac{j\alpha}{m} \text{ then}$$
12:    Set j* = j
13:    break
14:    end if
15:  end for
16:  if j* ≠ 0 then
17:    Remove all tests j with $p_j(n) \leq p_{(j*)}(n)$ from S
18:  end if
19:  if S = ∅ then
20:    break
21:  end if
22: end for
23: Reject all tests j ∈ J/S, the compliment of S.

Algorithm 9 depicts the pseudo-code of an illustrative multiple hypothesis test using a sequential Benjamin-Hochberg rejection procedure in a multiple stopping configuration without correction. As depicted, Algorithm 9 takes as input a maximum sample size N. In embodiments, maximum sample size N is defined, as described in detail above, such that a desired statistical Power (e.g., 1−β) is satisfied by the time N is reached. As can be seen in line 4, Algorithm 6 iterates until this maximum sample size N is reached, unless all tests are concluded prior to reaching N, as discussed below in reference to line 19. Algorithm 9 also takes as input equations (e.g., Equation 4) of sequential p-values, $p_1, \ldots, p_m$ for hypothesis tests j ∈ J={1, ..., m} of a multiple hypothesis test (e.g., multiple hypothesis test 102 of FIG. 1, 202 of FIGS. 2A & 2B).

At line 3, an active set of hypothesis tests are initialized as active set S. It will be appreciated that, at the point in time in which line 3 is executed, all hypothesis tests 1, ..., m are active. As such, when initialized, S=J. As can be seen, Algorithm 9 then iteratively samples all hypothesis tests j of the active set S at line 5. Algorithm 9 then updates the sequential p-values for all hypothesis tests j of the active set S at line 6. At line 7, all hypothesis tests, j, that are not in the active set S, are set to maintain the p-value from the previous iteration, n−1. As such, once concluded, the p-value for a test does not change. At line 8, the p-values for the hypothesis tests being analyzed that were produced by lines 6-7 are sorted into ascending order. Line 9 initializes a variable, j*, to zero. Lines 10-15 iterate through the ordered p-values, beginning with the largest p-value, to determine if any of the p-values satisfy the sequential Benjamin-Hochberg rejection procedure applied at line 11. If a p-value does not satisfy the sequential Benjamin-Hochberg rejection procedure at line 11, then processing moves to line 16. If a p-value does satisfy the sequential Benjamin-Hochberg rejection procedure applied at line 11, then the iterative processing of lines 10-15 terminates and processing proceeds to line 16. At line 16, if j* does not equal zero (i.e., line 11 was satisfied), then all hypothesis tests with p-values that are less than or equal to the p-value of the hypothesis test for index j* are removed from active set S at line 17. At line 19, a determination is made as to whether the active set S is empty, or a null set (e.g., all hypothesis tests have terminated). If the active set S is empty, then iterative processing stops and all tests are rejected at line 23. If the active set S is not empty, and maximum sample size N has not been reached, then the processing would return to line 4 where the iterative processing would continue. Once the maximum sample size, N, is reached, the iterative processing will stop and any tests in J that are not in S are rejected at line 23. The tests that are still considered active can be considered to have been affirmed.

---

Algorithm 10: Sequential Benjamin-Hochberg Procedure (Multiple Stopping with Correction)

1: Input: maximum sample size N
2: Input: Sequential p-values $p_1, \ldots, p_m$, corresponding to tests $1, \ldots, m$
3: Initialize: Active p-values $S = \{1, \ldots, m\}$
4:
$$\text{Initialize: } m' = m \sum_{j=1}^{m} \frac{1}{j}$$

5: for $n = 1, 2, \ldots, N$, do
6:    Draw one sample from each variation $j \in S$
7:    Update all $p_j(n)$ for $j \in S$
8:    Set $p_j(n) = p_j(n - 1)$ for all $j \notin S$
9:    Sort the p-values; i.e., $p_{(1)}(n) \leq p_{(2)}(n) \leq \ldots \leq p_{(m)}(n)$
10:   Set $j^* = 0$
11:   for $j = m, m - 1, \ldots, 1$ do
12:      if $p_{(j)}(n) \leq \frac{j\alpha}{m'}$, then
13:        Set $j^* = j$
14:        break
15:      end if
16:   end for
17:   if $j^* \neq 0$ then
18:     Remove all tests j with $p_j(n) \leq p_{(j^*)}(n)$ from S
19:   end if
20:   if $S = \emptyset$ then
21:     break
22:   end if
23: end for
24: Reject all tests $j \in J/S$, the compliment of S.

---

Algorithm 10 depicts the pseudo-code of an illustrative multiple hypothesis test using a sequential Benjamin-Hochberg rejection procedure in a multiple stopping configuration with correction. As depicted, Algorithm 10 is essentially the same as Algorithm 9, except there is a correction factor, m', utilized in the Benjamin-Hochberg rejection procedure at line 12, rather than m utilized at line 11 in Algorithm 9. Other than utilizing m', Algorithm 10 and Algorithm 9 function in a substantially similar manner. As such, the function described above in reference to Algorithm 9 can also be applied to Algorithm 10. As can be seen, m' is initialized at line 3, as such, all line references described in reference to Algorithm 9 would be incremented by 1, after line 3, when being applied to Algorithm 10.

Example Operating Environment

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more computer-readable storage media having instructions stored thereon, which, when executed by one or more processors of a computing device, provide the computing device with a hypothesis testing system to:
    iteratively distribute base digital content from a server computing device to a first plurality of user computing devices, first alternative digital content to a second plurality of user computing devices, and second alternative digital content to a third plurality of user computing devices, the base digital content representing a base case of a multiple hypothesis test, the first alternative digital content representing a first alternative case of a first hypothesis test of the multiple hypothesis test and the second alternative digital content representing a second alternative case of a second hypothesis test of the multiple hypothesis test;
    collect feedback for the multiple hypothesis test, at the server computing device and from the first, second, and third plurality of user computing devices, by iteratively monitoring interactions of the first plurality of user computing devices, the second plurality of user computing devices and the third plurality of user computing devices with the base digital content, the first alternative digital content, and the second alternative digital content, respectively;
    utilize the collected feedback to iteratively determine a plurality of confidence metrics that indicate error rates associated with the first and the second hypothesis test;
    determine to conclude the first hypothesis test based on a comparison of an error rate threshold to a first confidence metric of the plurality of confidence metrics and determining to continue the second hypothesis test based on a comparison of the error rate threshold to a second confidence metric of the plurality of confidence metrics;
    in response to determining to conclude the first hypothesis test and to continue the second hypothesis test, terminate distribution of the first alternative digital content, from the server computing device, to the second plurality of user computing devices, while continuing to iteratively distribute the base content, from the server computing device, to the first plurality of user computing devices and the second alternative digital content, from the server computing device, to the third plurality of user computing devices; and generate a user interface to inform a user of the hypothesis testing system of determining to conclude the first hypothesis test and to continue the second hypothesis test.

2. The one or more computer-readable storage media of claim 1, wherein the hypothesis testing system is further to:
in response to determining to conclude the first hypothesis test, terminate collecting feedback with respect to the first hypothesis test, at the server computing device; and
in response to determining to terminate the second hypothesis test, continue to iteratively distribute the second alternative digital content, from the server computing device, to the third plurality of user computing devices and collect the feedback with respect to the second alternative case, at the server computing device, and determine whether the second hypothesis test has concluded based on the comparison of the error rate threshold to the second confidence metric of the plurality of confidence metrics until the second hypothesis test is determined to have concluded or a maximum amount of feedback is reached.

3. The one or more computer-readable media of claim 1, wherein the hypothesis testing system is further to:
determine the maximum amount of feedback based on a desired Type-II error constraint for the multiple hypothesis test.

4. The one or more computer-readable storage media of claim 1, wherein the hypothesis testing system is further to:
in response to determining to conclude the first hypothesis test and to continue the second hypothesis test, continue to iteratively collect the feedback with respect to the first and second hypothesis tests, at the server computing device and from the second and third plurality of user computing devices, until a stopping rule for the multiple hypothesis test is satisfied.

5. The one or more computer-readable storage media of claim 4, wherein the stopping rule is based on determining that a portion of the multiple hypothesis tests have concluded, and wherein, in response to determining that the stopping rule is satisfied, the hypothesis testing system continues another portion of the hypothesis tests.

6. The one or more computer-readable storage media of claim 1, wherein the first confidence metric includes a first sequential p-value and the second confidence metric includes a second sequential p-value, and wherein:
the first sequential p-value is based on a first sequential statistic procedure, the first sequential p-value being in an inverse relationship with the first sequential statistic procedure, the first sequential statistic procedure designed to compare the feedback collected for the first alternative digital content, from the server computing device, with feedback collected for the base digital content, from the server computing device;
the second sequential p-value is based on a second sequential statistic procedure, the second sequential p-value being in an inverse relationship with the second sequential statistic procedure, the second sequential statistic procedure designed to compare the feedback collected for the second alternative digital content, from the server computing device, with feedback collected for the base digital content, from the server computing device;
the comparison of the error rate threshold to the first confidence metric utilizes the first sequential p-value to determine that the first hypothesis test can be concluded; and
the comparison of the error rate threshold to the second confidence metric utilizes the second sequential p-value to determine that the second hypothesis test has yet to conclude.

7. The one or more computer-readable storage media of claim 6, wherein the first sequential p-value is in an inverse relationship with a first maximum value produced by the first sequential statistic procedure, and the second sequential p-value is in an inverse relationship with a second maximum value produced by the second sequential statistic procedure.

8. The one or more computer-readable media of claim 1, wherein determining to conclude the first hypothesis test includes employing a sequential Bonferroni rejection procedure.

9. The one or more computer-readable media of claim 1, wherein determining to conclude the first hypothesis test includes employing a sequential Holm rejection procedure.

10. The one or more computer-readable media of claim 1, wherein determining to conclude the first hypothesis test includes employing a sequential Hochberg rejection procedure.

11. The one or more computer-readable media of claim 1, wherein determining to conclude the first hypothesis test includes employing a sequential Benjamin-Hochberg rejection procedure.

12. The one or more computer-readable media of claim 1, wherein the hypothesis testing system applies a corrective factor to resolve dependencies between the first hypothesis test and the second hypothesis test.

13. A computer-implemented method for sequentially evaluating a multiple hypothesis test, the method comprising:
iteratively receiving feedback for a first hypothesis test, at a server computing device, which includes a base case and a first alternative case, and a second hypothesis test, at the server computing device, which includes the base case and a second alternative case;
based on the received feedback, employing a predefined sequential statistic procedure to iteratively calculate a current sequential statistic value for the first hypothesis test, wherein the predefined sequential statistic procedure compares the base case to the first alternative case;
iteratively determining whether the current sequential statistic value is larger than a previously calculated sequential statistic value for the first hypothesis test;
in response to determining that the current sequential statistic value is larger than the previously calculated sequential statistic value, iteratively updating a first sequential p-value utilizing the current sequential statistic value, the first sequential p-value having an inverse relationship with the current sequential statistic and indicating a first error rate associated with the first hypothesis test;
determining to conclude the first hypothesis test based of a comparison of the first sequential p-value to an error rate threshold; and
determining to continue the second hypothesis test based on a comparison of a second sequential p-value to the error rate threshold, wherein the second sequential p-value indicates a second error rate associated with the second hypothesis test.

14. The computer-implemented method of claim 13, wherein updating the first sequential p-value utilizing the current sequential statistic value is based on the equation:

$$p_j(n) = \frac{1}{max_{i \leq n} \Lambda_j(n)}, j \in J = \{1, \ldots, m\}$$

where j represents a hypothesis test index, m represents a number of hypothesis tests in the multiple hypothesis test, n represents a current iteration, $\Lambda$ represents the sequential statistic procedure, and $p_j(n)$ represents a p-value for hypothesis test j at time n.

15. The computer-implemented method of claim 13, wherein a plurality of confidence metrics, which includes the first sequential p-value and the second sequential p-value, is employed to control a family-wise error rate (FWER) of the multiple hypothesis test.

16. The computer-implemented method of claim 13, wherein a plurality of confidence metrics, which includes the first sequential p-value and the second sequential p-value, is employed to control a false discovery rate (FDR) of the multiple hypothesis test.

17. The computer-implemented method of claim 13, wherein determining to conclude the first hypothesis test includes employing at least one of:
    a sequential Bonferroni rejection procedure;
    a sequential Holm rejection procedure;
    a sequential Hochberg rejection procedure; or
    a sequential Benjamin-Hochberg rejection procedure.

18. A computing system to sequentially evaluate a multiple hypothesis test, the computing system comprising:
    one or more processors; and
    one or more computer readable storage media, coupled with the one or more processors, having instructions stored thereon, which, when executed by the one or more processors cause the computing system to iteratively:
    distribute to user computing devices, in response to requests from the user computing devices, digital content, from a server computing device, for each hypothesis test of an active set of hypothesis tests of the multiple hypothesis test;
    collect feedback for each hypothesis test of the active set of hypothesis tests at the server computing device, wherein the feedback is indicative of interactions of the user computing devices with the distributed digital content;
    based on the feedback, calculate a sequential p-value for each hypothesis test, of the active set of hypothesis tests, wherein each sequential p-value indicates an error rate for the corresponding hypothesis test;
    automatically determine a first subset of hypothesis tests and a second subset of hypothesis tests, of the set of active hypothesis tests, based on a comparison between the sequential p-value for each corresponding hypothesis test of the subset of hypothesis tests to an error rate thresholds, wherein each of the hypothesis tests of the first subset of hypothesis tests has concluded and each of the hypothesis tests of the second subset of hypothesis tests is continued;
    remove each hypothesis tests of the subset of hypothesis tests from the active set of hypothesis tests to terminate the collection of feedback for the subset of hypothesis tests, at the server computing device, to conserve resources of the computing system, while continuing to iteratively distribute digital content, from the server computing device, and collect feedback for each of the hypothesis tests of the second subset of hypothesis tests, at the server computing device; and
    output a notification to a user of the computing system to indicate that the subset of hypothesis tests have concluded.

19. The computing system of claim 18, wherein to update the sequential p-value utilizing a current sequential statistic value is based on the equation:

$$p_j(n) = \frac{1}{max_{i \leq n} \Lambda_j(n)}, j \in J = \{1, \ldots, m\}$$

where j represents a hypothesis test index, m represents a number of hypothesis tests in the multiple hypothesis test, n represents a current iteration, and $\Lambda$ represents a sequential statistic procedure, and $p_j(n)$ represents a p-value for hypothesis test j at time n.

20. The computing system of claim 19, wherein determining to conclude the first hypothesis test includes employing at least one of:
    a sequential Bonferroni rejection procedure;
    a sequential Holm rejection procedure;
    a sequential Hochberg rejection procedure; or
    a sequential Benjamin-Hochberg rejection procedure.

* * * * *

UNITED STATES PATENT AND TRADEMARK OFFICE
CERTIFICATE OF CORRECTION

PATENT NO. : 10,586,200 B2  
APPLICATION NO. : 15/156008  
DATED : March 10, 2020  
INVENTOR(S) : Mohammad Ghavamzadeh et al.

Page 1 of 2

It is certified that error appears in the above-identified patent and that said Letters Patent is hereby corrected as shown below:

In the Specification

In Column 5, Line 27 (approx.), delete "$A_n$," and insert -- $\Lambda_n$, --, therefor.

In Column 5, Line 30, delete "$A_n \geq \gamma_n$." and insert -- $\Lambda_n \geq \gamma_n$. --, therefor.

In Column 9, Line 1, delete "$A_n$" and insert -- $\Lambda_n$ --, therefor.

In Column 9, Line 5, delete "$A_n$" and insert -- $\Lambda_n$ --, therefor.

In Column 9, Line 34 (approx.), delete "$A_n$" and insert -- $\Lambda_n$ --, therefor.

In Column 11, Line 16, delete "$j_{j,0}$" and insert -- $H_{j,0}$ --, therefor.

In Column 11, Line 33, delete "$A_j(n)$" and insert -- $\Lambda_j(n)$ --, therefor.

In the Claims

In Column 31, Line 29, Claim 3, after "readable" insert -- storage --.

In Column 32, Line 19, Claim 8, after "readable" insert -- storage --.

In Column 32, Line 23, Claim 9, after "readable" insert -- storage --.

In Column 32, Line 26, Claim 10, after "readable" insert -- storage --.

In Column 32, Line 30 (approx.), Claim 11, after "readable" insert -- storage --.

In Column 32, Line 35 (approx.), Claim 12, after "readable" insert -- storage --.

Signed and Sealed this  
Fourth Day of August, 2020

Andrei Iancu  
*Director of the United States Patent and Trademark Office*

In Column 32, Line 63, Claim 13, delete "of" and insert -- on --, therefor.

In Column 33, Line 50, Claim 18, after "tests" insert -- , --.